US012652274B2

(12) United States Patent
Kim et al.

(10) Patent No.: US 12,652,274 B2
(45) Date of Patent: Jun. 9, 2026

(54) ELECTRONIC DEVICE FOR TRANSMITTING AND RECEIVING END-TO-END ENCRYPTED DATA BASED ON ATTESTATION OF ELECTRONIC DEVICE AND THEREOF OPERATION METHOD IN WIRELESS COMMUNICATION SYSTEM

(71) Applicant: Samsung Electronics Co., Ltd., Suwon-si (KR)

(72) Inventors: Bumhan Kim, Suwon-si (KR); Jaewoo Seo, Suwon-si (KR); Jungil Cho, Suwon-si (KR); Joonghwan Lee, Suwon-si (KR); Choonghoon Lee, Suwon-si (KR); Hyewon Park, Suwon-si (KR); Jihyoun Kim, Suwon-si (KR); Hansang Song, Suwon-si (KR); Seungwon Shin, Suwon-si (KR); Yujung Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/761,867

(22) Filed: Jul. 2, 2024

(65) Prior Publication Data

US 2025/0030672 A1    Jan. 23, 2025

Related U.S. Application Data

(63) Continuation of application No. PCT/KR2024/009229, filed on Jul. 1, 2024.

(30) Foreign Application Priority Data

Jul. 21, 2023    (KR) ........................ 10-2023-0095563
Sep. 4, 2023    (KR) ........................ 10-2023-0116991

(51) Int. Cl.
*H04L 9/40* (2022.01)

(52) U.S. Cl.
CPC ...... *H04L 63/0442* (2013.01); *H04L 63/0853* (2013.01)

(58) Field of Classification Search
CPC .. H04L 63/20; H04L 63/0442; H04L 63/0853
(Continued)

(56) References Cited

U.S. PATENT DOCUMENTS

2017/0300720 A1    10/2017    Fascenda et al.
2019/0052683 A1    2/2019    Logue et al.
(Continued)

FOREIGN PATENT DOCUMENTS

KR    10-2019-0084171 A    7/2019
KR    10-2020-0136629 A    12/2020
(Continued)

OTHER PUBLICATIONS

International Search Report dated Sep. 26, 2024, issued in International Application No. PCT/KR2024/009229.

*Primary Examiner* — Anthony D Brown
(74) *Attorney, Agent, or Firm* — Jefferson IP Law, LLP

(57) ABSTRACT

A method of a first electronic device which is connected to a fabric network supporting end-to-end encryption (E2EE) in a wireless communication system is provided. The method includes generating a fabric key based on a pre-stored first device key and a second member key received from a second electronic device, transmitting the fabric key to the second electronic device through a fabric server, which manages the fabric network, and a service server, which manages service data, encrypting service data based on the fabric key, and transmitting the encrypted data to the second electronic device through the service server, wherein the fabric key is shared with the fabric server, which is a (Continued)

member entity of the fabric network, and the second electronic device, wherein the encrypted data is decryptable at a member entity of the fabric network that shares the fabric key.

18 Claims, 25 Drawing Sheets

(58) Field of Classification Search
USPC ............................................. 726/1; 713/171
See application file for complete search history.

(56) References Cited

U.S. PATENT DOCUMENTS

| | | | |
|---|---|---|---|
| 2020/0045026 A1 | 2/2020 | Sagalovskiy et al. | |
| 2020/0067702 A1* | 2/2020 | Xiong ................. | H04W 12/108 |
| 2021/0067495 A1 | 3/2021 | Yuting et al. | |
| 2023/0075085 A1 | 3/2023 | Lam et al. | |
| 2023/0336348 A1* | 10/2023 | Yoon ..................... | H04L 9/3213 |
| 2024/0380591 A1* | 11/2024 | Kundu ...................... | H04L 9/32 |

FOREIGN PATENT DOCUMENTS

| | | |
|---|---|---|
| KR | 10-2022-0036202 A | 3/2022 |
| KR | 10-2022-0121339 A | 9/2022 |
| KR | 10-2022-0146159 A | 11/2022 |

* cited by examiner

[Key Hierarchy of Device A (200)]                    [Key Hierarchy of Device B (300)]

Figure 7:
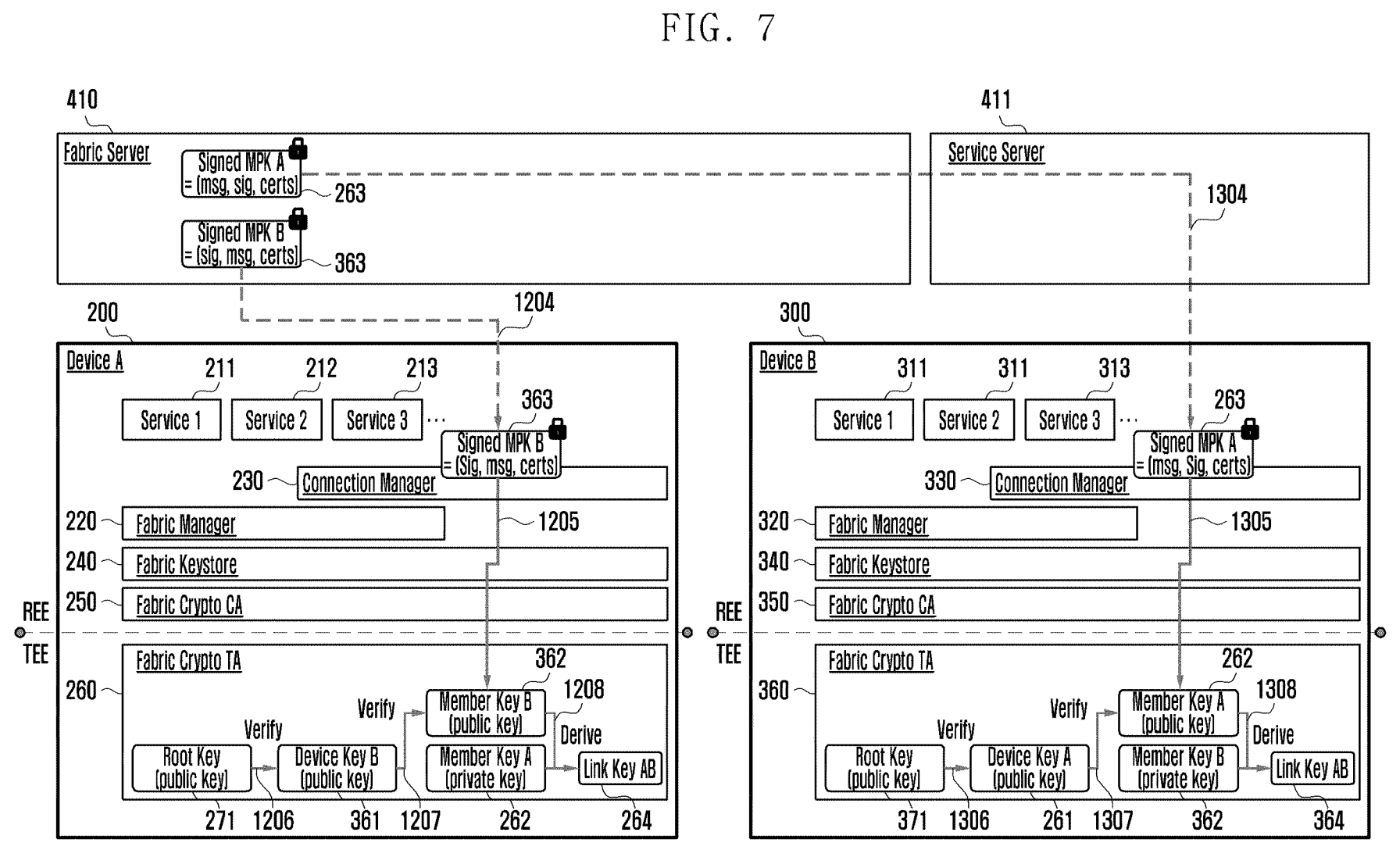

Fabric Server

263 Signed MPK A = (msg, sig, certs)

363 Signed MPK B = (sig, msg, certs)

411 Service Server

1304

1204

200 Device A

211 Service 1
212 Service 2
213 Service 3

220 Fabric Manager
240 Fabric Keystore
250 Fabric Crypto CA

230 Connection Manager

363 Signed MPK B = (sig, msg, certs)  1205

260 Fabric Crypto TA

271 Root Key (public key)  1206

361 Device Key B (public key)  1207

Verify

Verify

262 Member Key A (private key)

362 Member Key B (public key)  1208

Derive

264 Link Key AB

REE
TEE

300 Device B

311 Service 1
311 Service 2
313 Service 3

320 Fabric Manager
340 Fabric Keystore
350 Fabric Crypto CA

330 Connection Manager

263 Signed MPK A = (msg, sig, certs)  1305

360 Fabric Crypto TA

371 Root Key (public key)  1306

261 Device Key A (public key)  1307

Verify

Verify

262 Member Key B (private key)

262 Member Key A (public key)  1308

Derive

364 Link Key AB

REE
TEE

Copy your recoverycode

Write down the below and keep it in a safe place. It's your only way to recover your data if lose access to your trusted devices

1731

1Q2W3E4
R5T6Y7U
8I9OOP1
Q2W3E4R

If you lose this code, your data can't be recovered

1741     ◯     I wrote down my recovery code

1722     Next

ELECTRONIC DEVICE FOR TRANSMITTING AND RECEIVING END-TO-END ENCRYPTED DATA BASED ON ATTESTATION OF ELECTRONIC DEVICE AND THEREOF OPERATION METHOD IN WIRELESS COMMUNICATION SYSTEM

CROSS-REFERENCE TO RELATED APPLICATION(S)

This application is a continuation application, claiming priority under § 365(c), of an International application No. PCT/KR2024/009229, filed on Jul. 1, 2024, which is based on and claims the benefit of a Korean patent application number 10-2023-0095563, filed on Jul. 21, 2023, in the Korean Intellectual Property Office, and of a Korean patent application number 10-2023-0116991, filed on Sep. 4, 2023, in the Korean Intellectual Property Office, the disclosure of each of which is incorporated by reference herein in its entirety.

TECHNICAL FIELD

This disclosure relates to an electronic device. More particularly, the disclosure relates to an electronic device for transmitting and receiving end-to-end encrypted data based on attestation of the electronic device and method of operation thereof.

BACKGROUND ART

A plurality of electronic devices connected to a cloud server may transmit and receive encrypted data to each other through the cloud server. For example, a first electronic device may encrypt data and transmit the encrypted data to the cloud server through a secure channel using an encrypted communication protocol, such as secure sockets layer (SSL) or transport layer security (TLS). The cloud server may decrypt the encrypted data received from the first electronic device through the secure channel, and then encrypt the decrypted data using the encryption key of the cloud server, and store the encrypted data. In case where transmission of the encrypted data is requested from a second electronic device, the cloud server may recover the encrypted data using the encryption key of the cloud server, and then encrypt the data using a secure channel with the second electronic device and transmit the encrypted data to the second electronic device. The second electronic device may decrypt and store the encrypted data received from the cloud server.

Although the method for transmitting and receiving the encrypted data provides a high level of security, in case where the cloud server is attacked by an external electronic device and the encryption key of the cloud server is hacked, the encrypted data may be recovered by the external electronic device.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method for not exposing a key for encrypting service data between electronic devices connected to a fabric network supporting end-to-end encryption (E2EE) in a wireless communication system to a service server that manages the service data.

Additional aspects will be set forth in part in the description which follows and, in part, will be apparent from the description, or may be learned by practice of the presented embodiments.

Technical Solution

In accordance with an aspect of the disclosure, a method of a first electronic device which is connected to a fabric network supporting end-to-end encryption (E2EE) in a wireless communication system is provided. The method includes generating a fabric key based on a pre-stored first device key and a second member key received from a second electronic device, transmitting the fabric key to the second electronic device through a fabric server, which manages the fabric network, and a service server, which manages service data, encrypting service data based on the fabric key, and transmitting the encrypted data to the second electronic device through the service server, wherein the fabric key is shared with the fabric server, which is a member entity of the fabric network, and the second electronic device, wherein the encrypted data is decryptable at a member entity of the fabric network that shares the fabric key.

In accordance with another aspect of the disclosure, a method of a second electronic device which is connected to a fabric network supporting end-to-end encryption (E2EE) in a wireless communication system is provided. The method includes generating a second member key based on a pre-stored second device key, transmitting the second member key to a first electronic device through a fabric server, which manages the fabric network, and a service server, which manages service data, receiving a fabric key generated based on the second member key and a first member key of the first electronic device from the first electronic device through the fabric server and the service server, receiving service data encrypted based on the fabric key from the first electronic device through the service server, and decrypting the encrypted service data based on the fabric key.

In accordance with another aspect of the disclosure, one or more non-transitory computer-readable storage media storing computer-executable instructions that, when executed by one or more processors of a first electronic device, cause the first electronic device to perform operations are provided. The operations include generating a fabric key based on a pre-stored first device key and a second member key received from a second electronic device, transmitting the fabric key to the second electronic device through a fabric server, which manages the fabric network, and a service server, which manages service data, encrypting service data based on the fabric key, and transmitting the encrypted data to the second electronic device through the service server, wherein the fabric key is shared with the fabric server, which is a member entity of the fabric network, and the second electronic device, and wherein the encrypted data is decryptable at a member entity of the fabric network that shares the fabric key.

Advantageous Effects

The disclosure does not expose the key for encrypting service data between the electronic devices connected to a fabric network supporting end-to-end encryption (E2EE) in a wireless communication system to the service server that manages the service data, so there is an effect of maintaining the security of the service data even if the service server is attacked.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 7 is a conceptual diagram illustrating an operation for generating a link key in a fabric network of a wireless communication system according to an embodiment of the disclosure;

FIG. 8 is a conceptual diagram illustrating an operation for generating and sharing a fabric key in a fabric network of a wireless communication system according to an embodiment of the disclosure;

FIG. 9 is a conceptual diagram illustrating an operation for generating and sharing a service key in a fabric network of a wireless communication system according to an embodiment of the disclosure;

FIG. 11 is a conceptual diagram illustrating an operation for recovering an E2EE key for data in a fabric network of a wireless communication system according to an embodiment of the disclosure;

FIG. 14 is a conceptual diagram illustrating a user interface of a first electronic device for turning on/off an E2EE function in a fabric network of a wireless communication system according to an embodiment of the disclosure;

The same reference numerals are used to represent the same elements throughout the drawings.

MODE FOR DISCLOSURE

Figure 1:
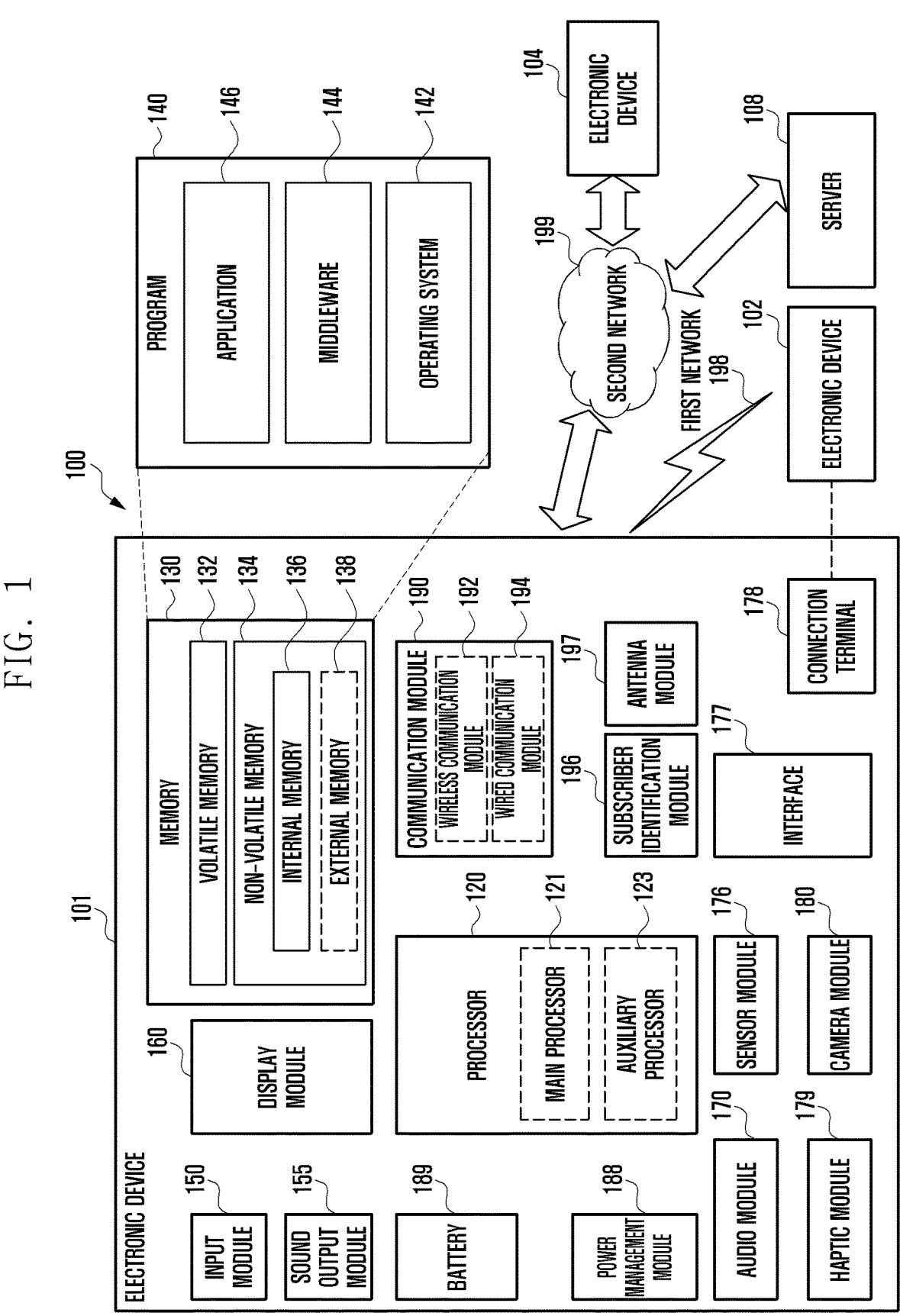
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments of the disclosure, at least one of the components (e.g., the connecting terminal 178) may be omitted from the electronic device 101, or one or more other components may be added in the electronic device 101. In various embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing or training. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. In other words, the artificial intelligence model may be implemented in software or hardware.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include one or more of the group of, for example, a microphone, a mouse, a keyboard, a key (e.g., a button), and a digital pen (e.g., a stylus pen). For example, the input module 150 may be connected to said members of the group.

The sound output module 155 may output sound signals to the outside of the electronic device 101. The sound output module 155 may include, for example, a speaker or a receiver. The speaker may be used for general purposes, such as playing sound, for example, multimedia or playing recordings or for communication. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) and/or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) and/or wirelessly. According to an embodiment of the disclosure, the interface 177 may include, for example, a high definition multimedia interface (HDMI), a universal serial bus (USB) interface, a secure digital (SD) card interface, and an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel and/or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) and/or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and/or authenticate the electronic device 101 in a communication network, such as the first network 198 or the second network 199, using subscriber information (e.g., international mobile subscriber identity (IMSI)) stored in the subscriber identification module 196.

The wireless communication module 192 may support one or more of a 5G network, a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit and/or receive a signal or power to or from the outside (e.g., the external electronic device) of the electronic device 101. According to an embodiment of the disclosure, the antenna module 197 may include an antenna including a radiating element including a conductive material and/or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting and/or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of the operations to be executed at the electronic device 101 may be executed at one or more of the external electronic device 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology and/or IoT-related technology.

Figure 2:
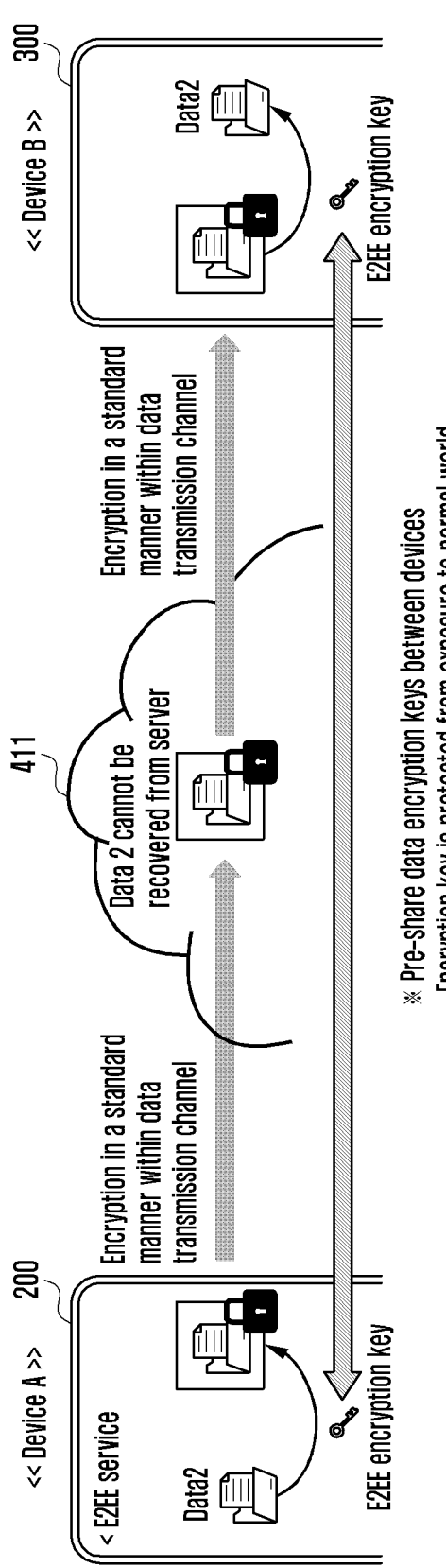
FIG. 2 is a conceptual diagram illustrating a method for transmitting and receiving end-to-end encrypted data in a wireless communication system according to an embodiment of the disclosure.

FIG. 2 is a conceptual diagram illustrating a method for transmitting and receiving end-to-end encrypted data in a wireless communication system according to an embodiment of the disclosure.

Referring to FIG. 2, Device A (i.e., a first electronic device 200) using an end-to-end encryption (E2EE) service may encrypt data 2 using an E2EE encryption key. The first electronic device 200 may be the electronic device 101 of FIG. 1 and may be referred to as a first electronic device. The first electronic device 200 may transmit encrypted data to a first service server 411. The first service server 411 may be the server 108 in FIG. 1. The first service server 411 may be a cloud server. The first service server 411 may transmit the encrypted data received from the first electronic device 200 to Device B (i.e., a second electronic device 300) without any additional processing. Device B 300 may be the external electronic device 102 or 104 in FIG. 1 and may be referred to as a second electronic device. The second electronic device 300 may receive encrypted data from the first service server 411. The second electronic device 300 may decrypt the encrypted data using a pre-shared E2EE encryption key.

For example, the first electronic device 200 and second electronic device 300 may be linked with the same account. The first electronic device 200 and second electronic device 300 linked with the same account may use the E2EE service. For example, the first electronic device 200 and second electronic device 300 may each be one of a plurality of electronic devices used by a user A. For example, the first electronic device 200 may be a smartphone, and the second electronic device 300 may be a smart TV or tablet. For example, the data encrypted in the smartphone may be decrypted only in the smartphone and the smart TV or tablet used by the user A of the smartphone. For example, the first service server 411, which receives the encrypted data from the first electronic device 200 and transmits the received encrypted data to the second electronic device 300, may not decrypt the encrypted data.

The first electronic device 200 and second electronic device 300 according to the disclosure may receive E2EE service support using a hierarchical encryption key structure. The reliability of hierarchical encryption keys may be improved through verification through device keys previously stored in each of the first electronic device 200 and the second electronic device 300.

A network including a plurality of electronic devices used by the user A may be referred to as a fabric network. For example, a fabric network may be managed by a fabric server. In the fabric network according to the disclosure, the E2EE service may include initially registering the first electronic device 200 in the fabric network, additionally registering the second electronic device 300 in the fabric network, backing up and recovering data for each service, sharing data between the first electronic device 200 and the second electronic device 300 for each service, and recovering the E2EE key.

Figure 3:
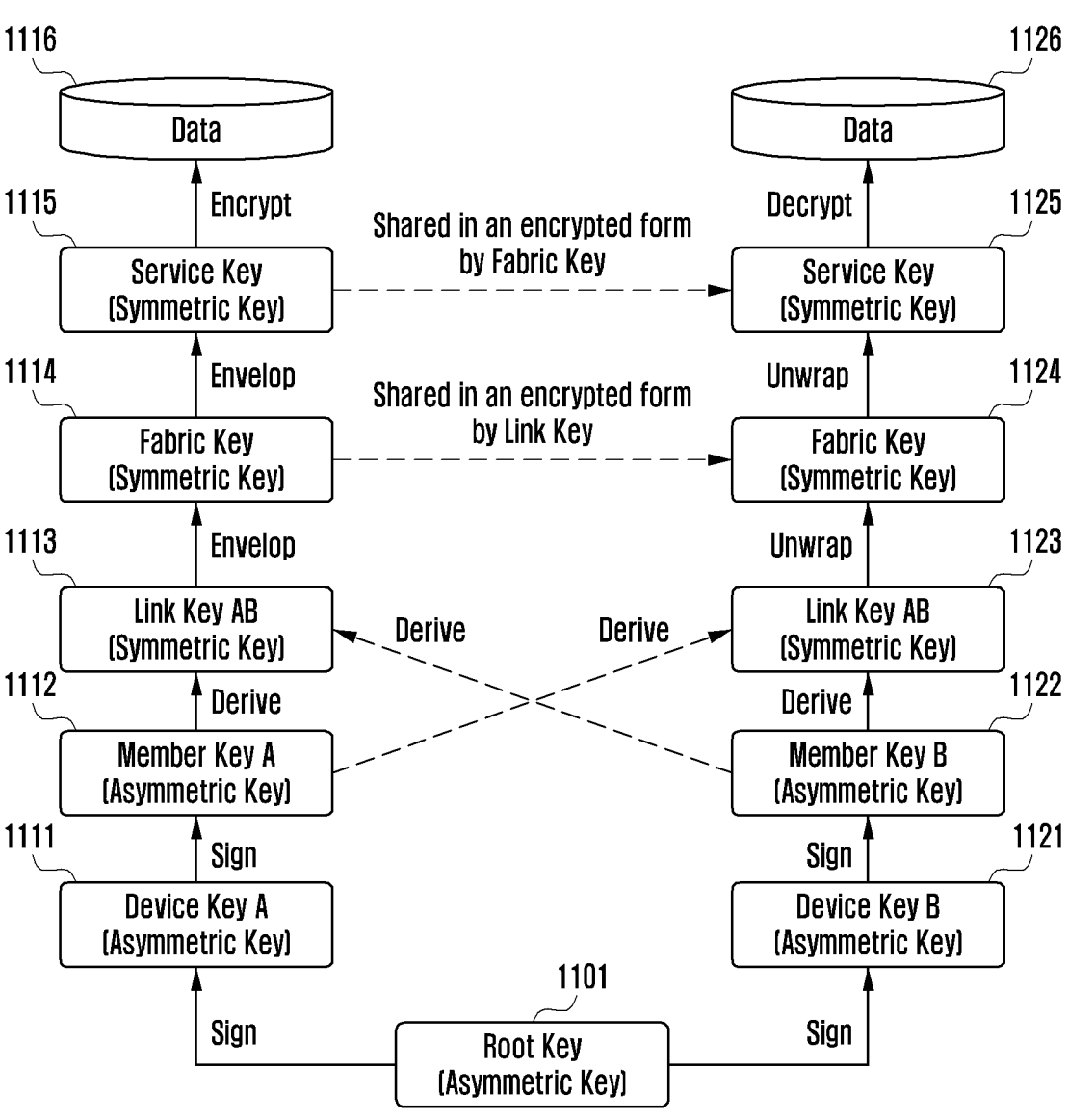
FIG. 3 is a conceptual diagram illustrating a hierarchical structure of encryption keys of each of a plurality of electronic devices in a wireless communication system according to an embodiment of the disclosure.

FIG. 3 is a conceptual diagram illustrating a hierarchical structure of encryption keys of each of a plurality of electronic devices in a wireless communication system according to an embodiment of the disclosure.

Referring to FIG. 3, a method for operating the first electronic device 200 to generate encrypted data based on E2EE using a hierarchical key structure in a fabric network according to the disclosure may include generating a root key 1101, generating Device key A of the first electronic device 200 1111, generating Member key A of the first electronic device 200 1112, generating a link key AB of the first electronic device 200 1113, generating a fabric key of the first electronic device 200 1114, generating a service key of the first electronic device 200 1115, and generating encrypted data based on E2EE 1116.

A method for operating the second electronic device 300 for decrypting E2EE-based encrypted data using a hierarchical key structure in a fabric network according to the disclosure may include generating a root key 1101, generating a device key B of the second electronic device 300 1121, generating Member key B of the second electronic device 300 1122, generating Link key AB of the second electronic device 300 1123, generating a fabric key of the second electronic device 300 1124, generating a service key 1125, and decrypting encrypted data based on E2EE 1126.

The root key may be the highest asymmetric key held by each manufacturer of the first electronic device 200 or the second electronic device 300. For example, the root key may be stored in advance in each of the first electronic device 200 and second electronic device 300. The root key is signed with a private key and the signature may be verified with a public key.

Device Key A and Device Key B may be verified through the private key of the root key through a certificate chain. The device key may be an asymmetric key (e.g., public key, secret key) that is individually generated in each of the first electronic device 200 and second electronic device 300. For example, Device key A may be stored in the first electronic device 200 by the manufacturer of the first electronic device 200 during the manufacturing stage of the first electronic device 200. Device key A may be verified with the root certificate of the manufacturer of the first electronic device 200. Device key A may be used to verify the validity of Member key A. Device key A may be a key that may verify the integrity of the first electronic device 200. Device key A may include a key pair of a signing key, which is a secret key, and a verification key, which is a public key. In addition, Device key B may be a key that may verify the integrity of the second electronic device 300. Device key B may include a key pair of a signature key, which is a secret key, and a verification key, which is a public key. Device key B may be stored in the second electronic device 300 by the manufacturer of the second electronic device 300 during the manufacturing stage of the second electronic device 300. Device key B may be verified with the root certificate of the manufacturer of the second electronic device 300. Device key B may be used to verify the validity of Member key B. Member key A and Member key B may be asymmetric keys that are randomly generated for each of the first electronic device 200 and second electronic device 300 for E2EE service. Member key A may be signed with Device key A. Member key B may be signed with Device key B. Member key A and Member key B may be verified for legitimacy through verification of the corresponding signature.

Link key AB may perform a key agreement protocol in the first electronic device 200 and the second electronic device 300 based on Member key A and Member key B and may be a shared symmetric key (pairwise key or symmetric key). The first electronic device 200 and the second electronic device 300 may share the same Link key AB. Meanwhile, a third electronic device (not shown) may share a link key that is different from Link key AB shared between the first electronic device 200 and the second electronic device 300. For example, Link key AB may be used to encrypt the fabric key, which is a symmetric key, and share the fabric key between the first electronic device 200 and the second electronic device 300.

The fabric key may be a group key shared equally by all electronic devices connected to the fabric network including the first electronic device 200 and second electronic device 300. For example, the fabric key may be used to encrypt a service key, which is a symmetric key, and share the service key between the first electronic device 200 and the second electronic device 300.

The service keys may be generated differently depending on each service or purpose, such as health, internet, and memo. The service key may be used to encrypt and decrypt data corresponding to the corresponding service. For example, the first electronic device 200 and the second electronic device 300 may each share and use the same service key according to each service.

Figure 4:
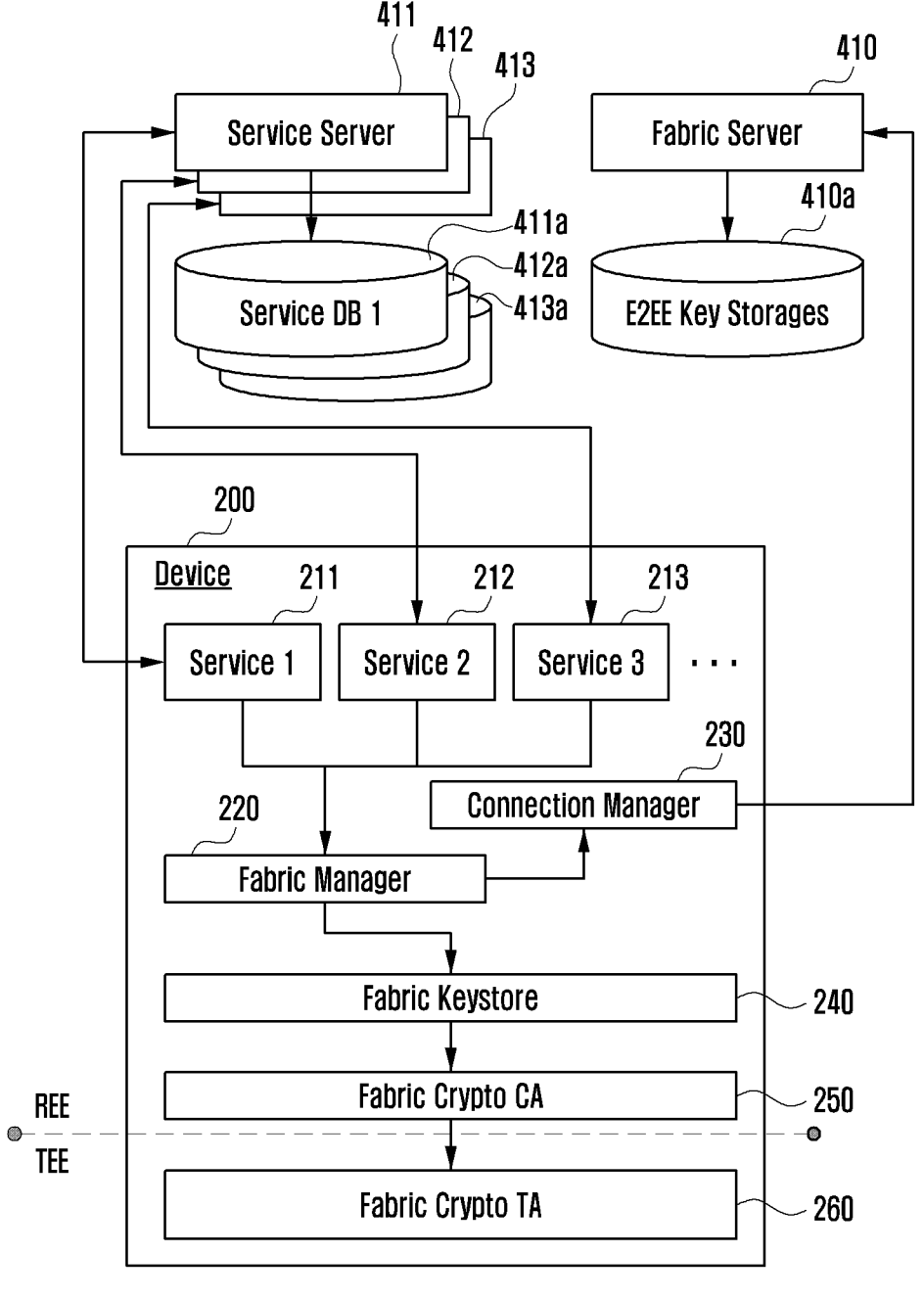
FIG. 4 is a conceptual diagram illustrating a fabric network including a first electronic device, a plurality of service servers, and a fabric server in a wireless communication system according to an embodiment of the disclosure.

FIG. 4 is a conceptual diagram illustrating a fabric network including a first electronic device, a plurality of service servers, and a fabric server in a wireless communication system according to an embodiment of the disclosure.

Referring to FIG. 4, the fabric network may include the first electronic device 200, the plurality of service servers 411, 412, and 413, and the fabric server 410.

The plurality of service servers 411, 412, and 413 are remote servers for managing respective corresponding service data, and may perform operations to store and share encrypted service data. For example, the first service server 411 may load or store service data through a first service database (DB) 411a. The first service server 411 may be wirelessly connected to the first electronic device 200. The first service server 411 may transmit first service data to the first electronic device 200. The first electronic device 200 may receive first service data from the first service server 411. The first electronic device 200 may provide the first service server 411 to the user based on the first service data.

The second service server 412 may load or store service data through a second service DB 412a. The second service server 412 may be wirelessly connected to the first electronic device 200. The second service server 412 may transmit second service data to the first electronic device 200. The first electronic device 200 may receive the second service data from the second service server 412. The first electronic device 200 may provide the second service server 412 to the user based on the second service data.

The third service server 413 may load or store service data through a third service DB 413a. The third service server 413 may be wirelessly connected to the first electronic device 200. The third service server 413 may transmit third service data to the first electronic device 200. The first electronic device 200 may receive third service data from the third service server 413. The first electronic device 200 may provide the third service server 413 to the user based on the third service data.

The first electronic device 200 may include a fabric manager 220, a connection manager 230, a fabric key storage 240, a fabric crypto client application (CA) 250, and a fabric crypto trusted application (TA) 260.

The fabric manager 220 may perform management functions of registering, adding, and deleting at least one electronic device that interworks with the first electronic device 200 for the E2EE service, and a function of controlling access for each service. For example, in case of registering the first electronic device 200 in the E2EE member list of the fabric network, the fabric manager 220 may transmit the member key of the first electronic device 200 to the fabric server 110 for registration. In case of adding the second electronic device 300 to the E2EE member list of the fabric network, the fabric manager 220 may receive a member key from the second electronic device 300. The fabric manager 220 may delete the first electronic device 200 or the second electronic device 300 from the member list of the fabric network. In case where encryption or decryption of data related to at least one service among the plurality of services 211, 212, and 213 is required, the fabric manager 220 may confirm access rights corresponding to data related to at least one service among the plurality of services 211, 212, and 213, and identify a service key available for data related to at least one service among the plurality of services 211, 212, and 213.

The fabric key storage 240 may perform key management, such as generation, verification, deletion, and storage of E2EE keys, such as member keys, link keys, fabric keys, and service keys. The fabric key storage 240 may transmit a request message requesting encryption or decryption of data related to at least one service among the plurality of services 211, 212, and 213 to the fabric crypto CA 250 and fabric crypto TA 260.

The fabric crypto CA 250 may operate in a rich execution environment (REE) of the first electronic device 200. The fabric crypto CA 250 may transmit the request message received from the fabric key storage 240 to the fabric crypto TA 260. In the rich execution environment, processing operations for E2EE keys may not be performed.

The fabric crypto TA 260 may operate in a trusted execution environment (TEE) of the first electronic device 200. The fabric crypto TA 260 may receive a request message transmitted from the fabric key storage 240 through the fabric crypto CA 250. The fabric crypto TA 260 may perform an operation for at least one of generating, verifying, deleting, and storing an E2EE key based on the request message in the secure execution environment.

The rich execution environment may be used in a rich operating system and may be an environment in which applications that do not require separate security may be executed. The secure execution environment may be used in an operating system that requires security to provide a safe area, and may be an environment that provides applications and resources that require security. For example, the rich execution environment and secure execution environment may be physically or logically separate environments. For example, the secure execution environment may be implemented with a TrustZone structure. For example, the secure execution environment may be implemented in a secure processor or embedded secure element (eSE).

The connection manager 230 may receive a public key (member key) and an encrypted symmetric key (encrypted fabric key and encrypted service keys) from the fabric server 410. In addition, the connection manager 230 may transmit a public key (member key) and encrypted symmetric key (encrypted fabric key and encrypted service keys) to the fabric server 410.

The fabric server 410 may transmit the public key (member key) and encrypted symmetric key (encrypted fabric key and encrypted service keys) stored in the E2EE key storage to the connection manager 230 based on the request message received from the connection manager 230. In addition, the fabric server 410 may receive a public key (member key) and encrypted symmetric key (encrypted fabric key and encrypted service keys) from the connection manager 230. The fabric server 410 may store the public key (member key) and encrypted symmetric key (encrypted fabric key and encrypted service keys) in E2EE key storages 410a based on the request message received from the connection manager 230.

Figure 5:
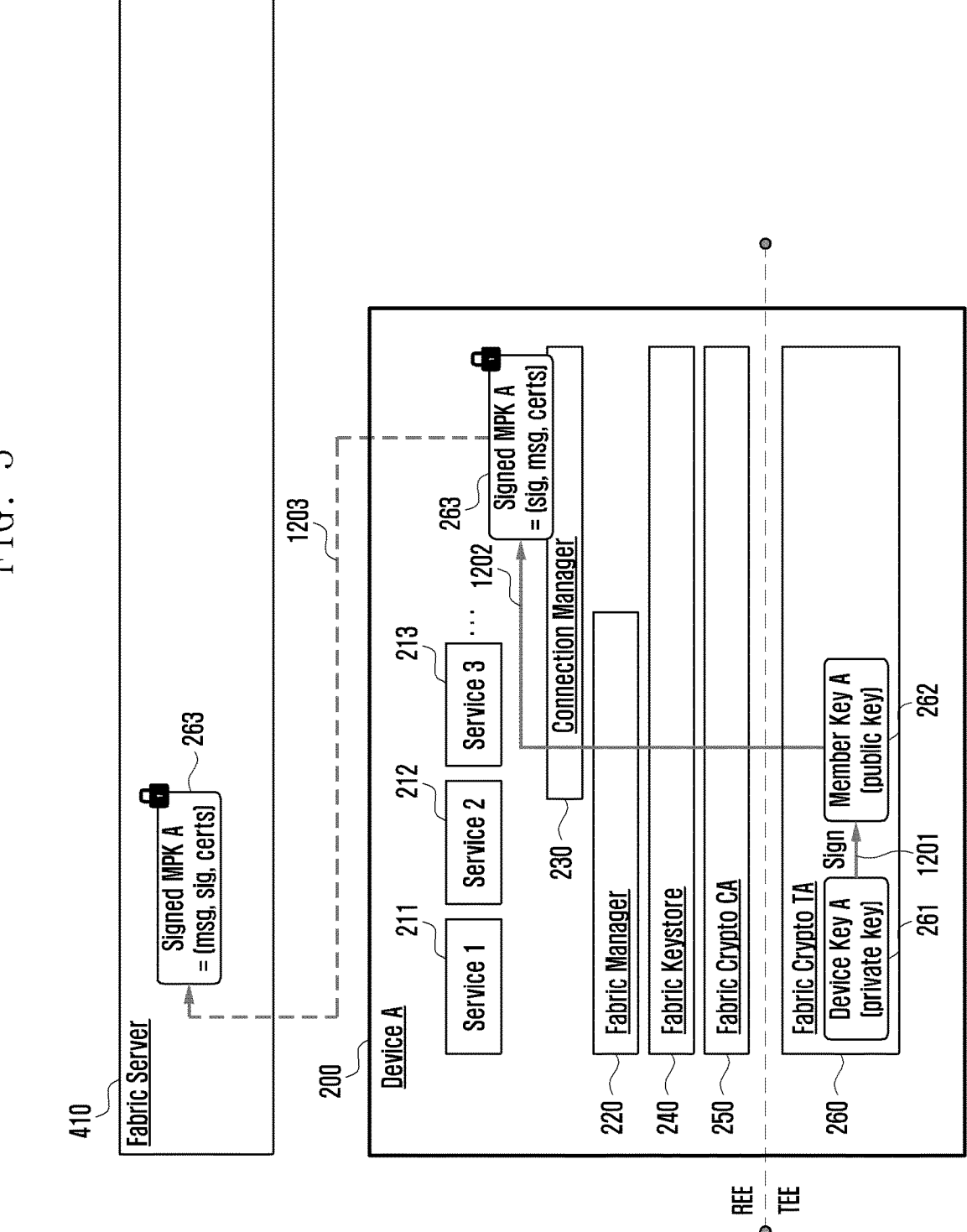
FIG. 5 is a conceptual diagram illustrating an operation for registering a first electronic device in an E2EE member list in a fabric network of a wireless communication system, according to an embodiment of the disclosure.

FIG. 5 is a conceptual diagram illustrating an operation for registering a first electronic device in an E2EE member list in a fabric network of a wireless communication system, according to an embodiment of the disclosure.

Referring to FIG. 5, in case where the first electronic device (Device A, 200) is commanded to turn on E2EE application after logging in to the user's account, the first electronic device 200 may be registered in an E2EE member list. The first electronic device 200 may be referred to as A.

The fabric manager 220 may confirm whether the user's account login has been performed with 2 factor authentication (2FA) from an account server (not shown). In case where the user's account login is not performed with 2FA, the fabric manager 220 may transmit a message requesting 2FA authentication to an account server. The fabric manager 220 may perform an operation to generate Member key A 262 after authentication of the first electronic device 200 is completed through 2FA authentication.

The fabric manager 220 may transmit fabricID and memberID to the fabric key storage 240. fabricID corresponds to one user account and is an identifier to identify the user account. memberID is an identifier to identify a member (electronic device) connected to the fabric network.

The fabric key storage 240 may receive fabricID and memberID from the fabric manager 220. The fabric key storage 240 may generate a request message requesting to generate a random key pair based on fabricID and memberID. The fabric key storage 240 may transmit a request message to the fabric crypto CA 250.

The fabric crypto CA 250 may receive a request message from the fabric Key storage 240. The fabric crypto CA 250 may transmit a request message to the fabric crypto TA 260. The fabric crypto TA 260 may receive a request message from the fabric key storage 240 through the fabric crypto CA 250.

In operation 1201, the fabric crypto TA 260 may generate Member key A 262 based on Device key A 261 previously stored during the process of manufacturing the first electronic device 200. Member key A 262 may include a member public-key (MPK) and member secret-key (MSK) generated based on Keygen (param) (Mem). Here, param is a cryptographic parameter for generating an asymmetric key and may include elliptic-curve (EC) parameters and key size. The MSK is stored in the fabric crypto TA 260, and the MPK may be returned.

In operation 1202, the fabric key storage 240 may request the fabric crypto TA 260 to sign the msg based on a device signing key (DSK) included in Device key A 261 through the fabric crypto CA 250. Here, it may be sig=Sign (DSK, msg) and msg=(fabricID, memberID, MPK). The signature value sig and the DPK's certificate chain (certs) for verifying the signature may be returned.

The fabric manager 220 may transmit a request message to the connection manager 230 requesting that sig and certs be transmitted to the fabric server 410. The connection manager 230 may receive a request message from the fabric manager 220 requesting to transmit sig and certs to the fabric server 410.

In operation 1203, the connection manager 230 may transmit signed MPK A (signed MPK A=(msg, sig, certs)) 263 to the fabric server 410 based on the request message. The fabric server 410 may receive the signed MPK A 263 from the connection manager 230.

Figure 6:
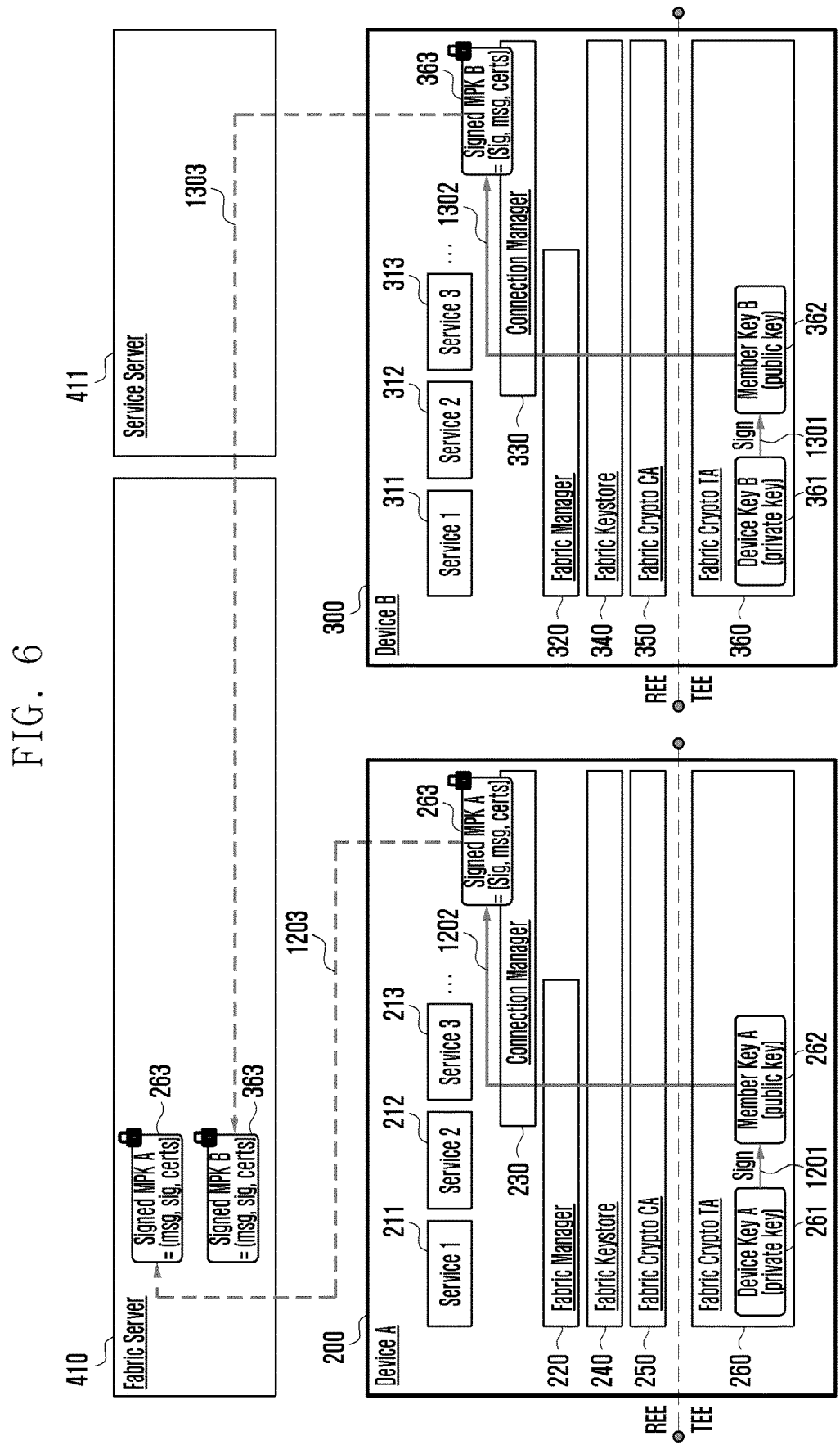
FIG. 6 is a conceptual diagram illustrating an operation for adding a second electronic device to an E2EE member list in a fabric network of a wireless communication system, according to an embodiment of the disclosure.

FIG. 6 is a conceptual diagram illustrating an operation for adding a second electronic device to an E2EE member list in a fabric network of a wireless communication system according to an embodiment of the disclosure.

Referring to FIG. 6, in case where the second electronic device (Device B, 300) is commanded to turn on the E2EE application after logging in with the same user account as the user of the first electronic device 200, the second electronic device (Device B) 300 may be added to the E2EE member list. The second electronic device 300 may be referred to as B.

A fabric manager 320 may confirm from an account server (not shown) whether the user's account login has been performed with 2FA. In case where the user's account login is not performed with 2FA, the fabric manager 320 may transmit a message requesting 2FA authentication to the account server. The fabric manager 320 may perform an operation to generate Member key B 362 after authentication of the second electronic device 300 is completed through 2FA authentication.

The fabric manager 320 may transmit fabricID and memberID to a fabric key storage 340. fabricID corresponds to one user account and is an identifier to identify the user account. memberID is an identifier to identify a member (electronic device) connected to the fabric network.

The fabric key storage 340 may receive fabricID and memberID from the fabric manager 320. The fabric key storage 340 may generate a request message requesting to generate a random key pair based on fabricID and memberID. The fabric key storage 340 may transmit a request message to a fabric crypto CA 350.

The fabric crypto CA 350 may receive a request message from the fabric key storage 340. The fabric crypto CA 350 may transmit a request message to a fabric crypto TA 360. The fabric crypto TA 360 may receive a request message from the fabric key storage 340 through the fabric crypto CA 350.

In operation 1301, the fabric crypto TA 360 may generate Member key B 362 based on Device key B 361 previously stored during the process of manufacturing the second electronic device 300. Member key B 362 may include member public-key (MPK) and member secret-key (MSK) generated based on Keygen (param). Here, param is a cryptographic parameter for generating an asymmetric key and may include elliptic-curve (EC) parameter, key size, or the like. The MSK is stored in the fabric crypto TA 360, and the MPK may be returned.

In operation 1302, the fabric key storage 340 may request the fabric crypto TA 360, through the fabric crypto CA 350, to sign the msg based on the device signing key (DSK) included in Device Key B 361. Here, it may be sig=Sign (DSK, msg) and msg=(fabricID, memberID, MPK). The signature value sig and the DPK's certificate chain (certs) for verifying the signature may be returned.

The fabric manager 320 may transmit a request message to a connection manager 330 requesting that sig and certs be transmitted to the fabric server 109. The connection manager 330 may receive a request message from the fabric manager 320 requesting to transmit sig and certs to the fabric server 410.

In operation 1303, the connection manager 330 may transmit a signed MPK B (signed MPK B=(msg, sig, certs)) 363 to the fabric server 410 based on the request message.

The fabric server 410 may receive the signed MPK B 363 from connection manager 230. The fabric crypto TA 360 may generate and store Service Key 1, which is a random symmetric key for encrypting and decrypting the data related to a first service function 311. In case where E2EE is applied to the data related to at least one service among a plurality of other services including a second service (Service 2) 312 and a third service 313, the fabric crypto TA 360 may generate each service key for the data related to each service.

FIG. 7 is a conceptual diagram illustrating an operation for generating a link key in a fabric network of a wireless communication system according to an embodiment of the disclosure.

Referring to FIG. 7, the first electronic device 200 and second electronic device 300 may perform an operation to generate the same link key. In operation 1204, the connection manager 230 may receive the signed MPK B 363 from the fabric server 410.

In operation 1205, the fabric manager 220 of the first electronic device 200 may transmit to the fabric key storage 240 a request message requesting to generate Link key AB 264 that is linked to the second electronic device 300 based on the signed MPK B 363.

Based on the request message, the fabric key storage 240 may transmit a request message requesting that the fabric crypto TA 260 performs an operation for key agreement through the fabric crypto CA 250. The fabric crypto TA 260 may receive a request message requesting to perform an operation for key agreement from the fabric key storage 240 through the fabric crypto CA 250.

In operation 1206, the fabric crypto TA 260 may perform an operation for key approval based on the request message. The fabric crypto TA 260 may verify Device key B 361 based on a root key 271. In operation 1207, the fabric crypto TA 260 may verify Member key B 362 based on Verified device key B 361. The fabric crypto TA 260 may generate a shared secret agreement (shared_secret=ECDK (MSK A, MSK B)) through an elliptic curve Diffie-Hellman (ECDH) algorithm. In operation 1208, the fabric crypto TA 260 may generate Link Key AB (Link Key AB=KDF (shared_secret, salt)) 264 based on the shared secret agreement.

In operation 1204, the connection manager 330 of the second electronic device 300 may receive the signed MPK A 263 from the fabric server 410.

In operation 1305, the fabric manager 320 of the second electronic device 300 may transmit to the fabric key storage 340 a request message requesting to generate Link key AB 264 that is linked to the first electronic device 200 based on the signed MPK A 263.

The fabric key storage 340 may transmit to the fabric crypto TA 360 a request message requesting to perform an operation for key agreement through the fabric crypto CA 350 based on the request message. The fabric crypto TA 360 may receive a request message requesting to perform an operation for key agreement from the fabric key storage 340 through the fabric crypto CA 350.

In operation 1306, the fabric crypto TA 360 may perform an operation for key approval based on the request message. The fabric crypto TA 360 may verify Device key A 261 based on a root key 371. In operation 1307, the fabric crypto TA 360 may verify Member key A 262 based on the verified Device key A 261. The fabric crypto TA 360 may generate a shared secret agreement (shared_secret=ECDK (MSK A, MSK B)) through the elliptic curve Diffie-Hellman (ECDH) algorithm. In operation 1308, the fabric crypto TA 360 may generate Link Key AB (Link Key AB=KDF (shared_secret, salt)) 364 based on the shared secret agreement.

Figure 8:
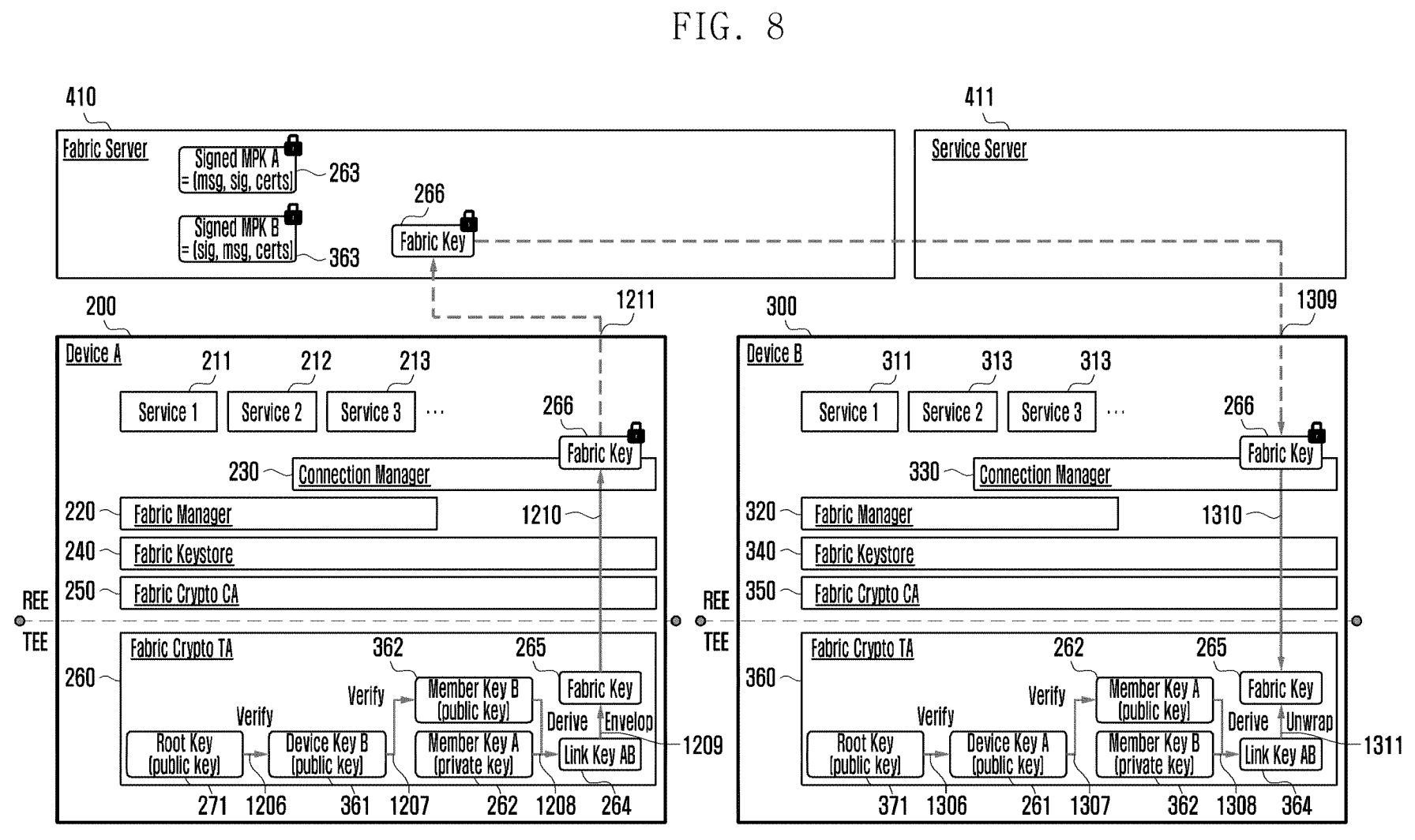

FIG. 8 is a conceptual diagram illustrating an operation for generating and sharing a fabric key in a fabric network of a wireless communication system according to an embodiment of the disclosure.

Referring to FIG. 8, the fabric key storage 240 of the first electronic device 200 may transmit to the fabric crypto TA 260 a request message requesting to generate a fabric key 265 through the fabric crypto CA 250. The fabric crypto TA 260 may receive a request message requesting to generate the fabric Key 264 from the fabric key storage 240 through the fabric crypto CA 250. The fabric crypto TA 260 may generate the fabric Key 265, which is a random symmetric key, based on the request message.

The fabric manager 220 may transmit to the fabric key storage 240 a message requesting to transmit the fabric key 265. The fabric key storage 240 may receive a message requesting to transmit the fabric key 265 from the fabric manager 220.

The fabric key storage 240 may transmit to the fabric crypto TA 260 a message requesting to generate a random key (e.g., advanced encryption standard (AES)) through the fabric crypto CA 250. The fabric crypto TA 260 may receive a message requesting to generate a random key from the fabric key storage 240 through fabric crypto CA 250. The fabric crypto TA 260 may generate the fabric key 265, which is a random key (randomAESkey( )).

The fabric key storage 240 may transmit to the fabric crypto TA 260 through the fabric crypto CA 250 a message requesting that the fabric key 265 be encrypted based on the link key AB 264. The fabric crypto TA 260 may receive a message requesting to encrypt the fabric Key 265 based on Link Key AB 264 from the fabric key storage 240 through the fabric crypto CA 250.

In operation 1209, the fabric crypto TA 260 may encrypt the fabric key 265 based on Link key AB 264. The fabric crypto TA 260 may return the encrypted fabric key (envelopedFabricKey=Enc (linkKey, fabricKey)) 266.

In operation 1210, the fabric manager 220 may transmit to the connection manager 230 a message requesting that the encrypted fabric key 266 be transmitted to the fabric server 109. The connection manager 230 may receive a message from the fabric manager 220 requesting to transmit the encrypted fabric key 266 to the fabric server 109.

In operation 1211, the connection manager 230 may transmit the encrypted fabric key 266 to the fabric server 109. The fabric server 410 may receive the encrypted fabric key 266 from the connection manager 230.

In operation 1309, the fabric server 410 may transmit the encrypted fabric key 266 to the second electronic device 300. The second electronic device 300 may receive the encrypted fabric key 266 from the fabric server 410 through the connection manager 330.

In operation 1310, the fabric key storage 340 may transmit to the fabric crypto TA 360 through the fabric crypto CA 350 a message requesting to decrypt the fabric key 266 encrypted with Link key AB 264. The fabric crypto TA 360 may receive a message requesting to decrypt the fabric Key 266 encrypted with Link Key AB 264 from the fabric key storage 340 through the fabric crypto CA 350.

In operation 1311, the fabric crypto TA 360 may decrypt the fabric key 266 encrypted based on the link key AB 364, which is the same as Link key AB 264. The fabric crypto TA 360 may store the decrypted fabric key (fabricKey=Dec (linkKey, envelopedFabricKey)) 265.

Figure 9:
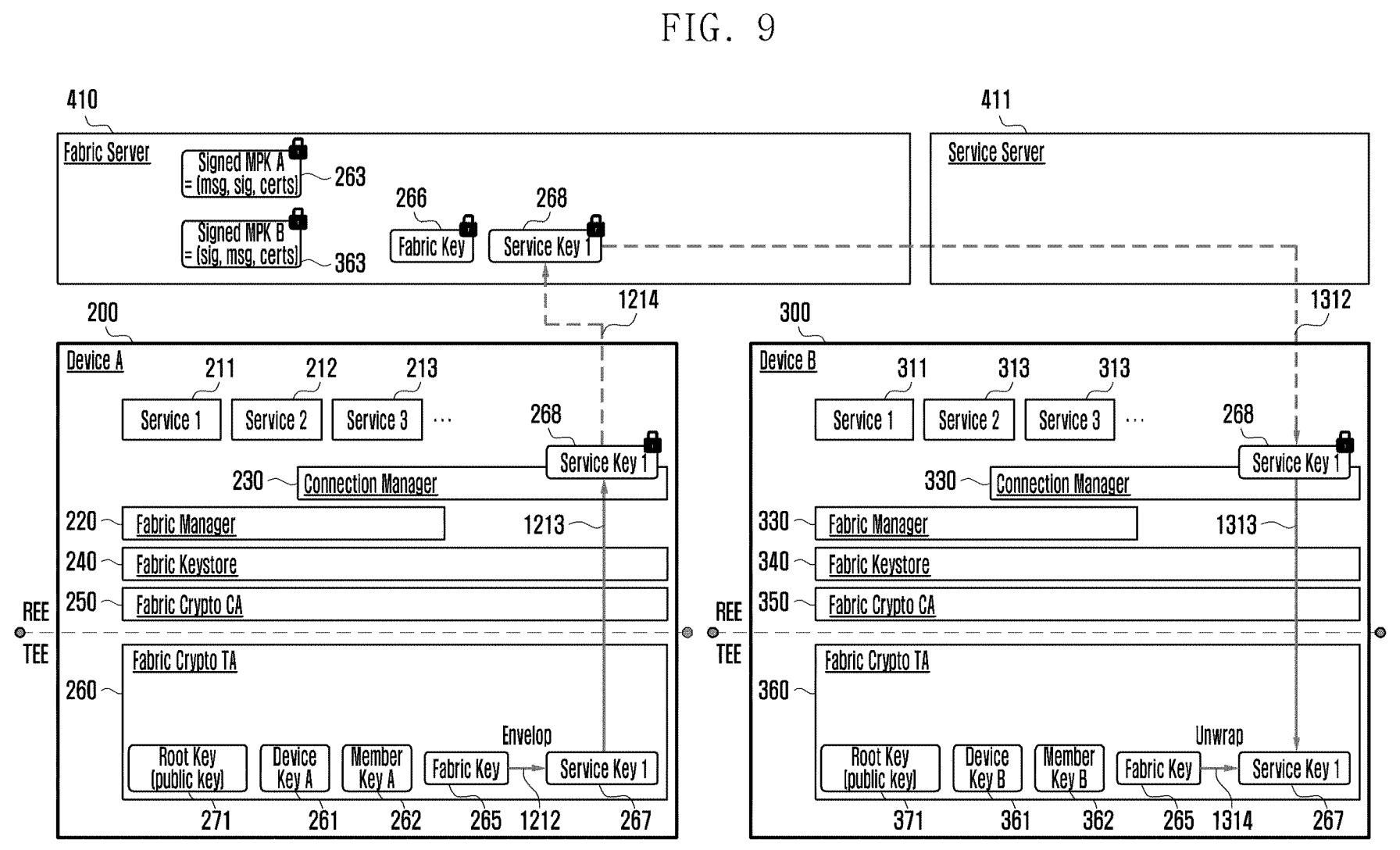

FIG. 9 is a conceptual diagram illustrating an operation for generating and sharing a service key in a fabric network of a wireless communication system according to an embodiment of the disclosure.

Referring to FIG. 9, in case where E2EE is applied to the data related to the first service (Service 1) 211, the fabric key storage 240 may transmit to the fabric crypto TA 260 through the fabric crypto CA 250 a message requesting to generate a service key 1 267 for the data related to the first service function 211. The fabric crypto TA 260 may receive a message requesting to generate Service key 1 (Service 1 key) 267 for the data related to the first service function 211 from the fabric key storage 240 through the fabric crypto CA 250. The fabric crypto TA 260 may generate and store Service Key 1 267, which is a random symmetric key for encrypting and decrypting the data related to the first service function 211. In case where E2EE is applied to the data related to at least one service among a plurality of other services including the second service (Service 2) 212 and third service 213, the fabric crypto TA 260 may generate each service key for the data related to each service.

In operation 1212, the fabric crypto TA 260 may encrypt Service Key 1 267 based on the fabric Key 265.

In operation 1213, the fabric key storage 240 may individually encrypt each service key for the data related to each service based on the fabric key 265 through the fabric crypto TA 260.

In operation 1214, the connection manager 230 may transmit the encrypted service key 1 (envelopedServiceKey) 268 to the fabric server 410. Here, it may be envelopedServiceKey=Enc (fabricKey, serviceKey).

In operation 1312, the fabric server 410 may transmit the encrypted service key 1 268 to the second electronic device 300 through the first service server 111. The connection manager 330 of the second electronic device 300 may receive the encrypted service key 1 268 from the fabric server 410 through the first service server 111.

In operation 1313, the fabric key storage 340 may transmit to the fabric crypto TA 260 through the fabric crypto CA 250 a message requesting to decrypt the Service key 1 268 encrypted based on the fabric key 265. The fabric crypto TA 260 may receive a message requesting to decrypt the Service Key 1 268 encrypted based on the fabric Key 265 from the fabric key storage 340 through the fabric crypto CA 250.

In operation 1314, the fabric crypto TA 260 may decrypt the encrypted Service Key 1 268 based on the fabric Key 265. The fabric crypto TA 260 may store the decrypted service key 1 (serviceKey=Dec(fabricKey, envelopedServiceKey)) 267.

Although the above-described embodiment illustrates the first electronic device 200 and the second electronic device 300 in the fabric network, the above-described embodiment may be equally applied not only to the first electronic device 200 and second electronic device 300, but also to a third electronic device or other electronic devices.

Figure 10:
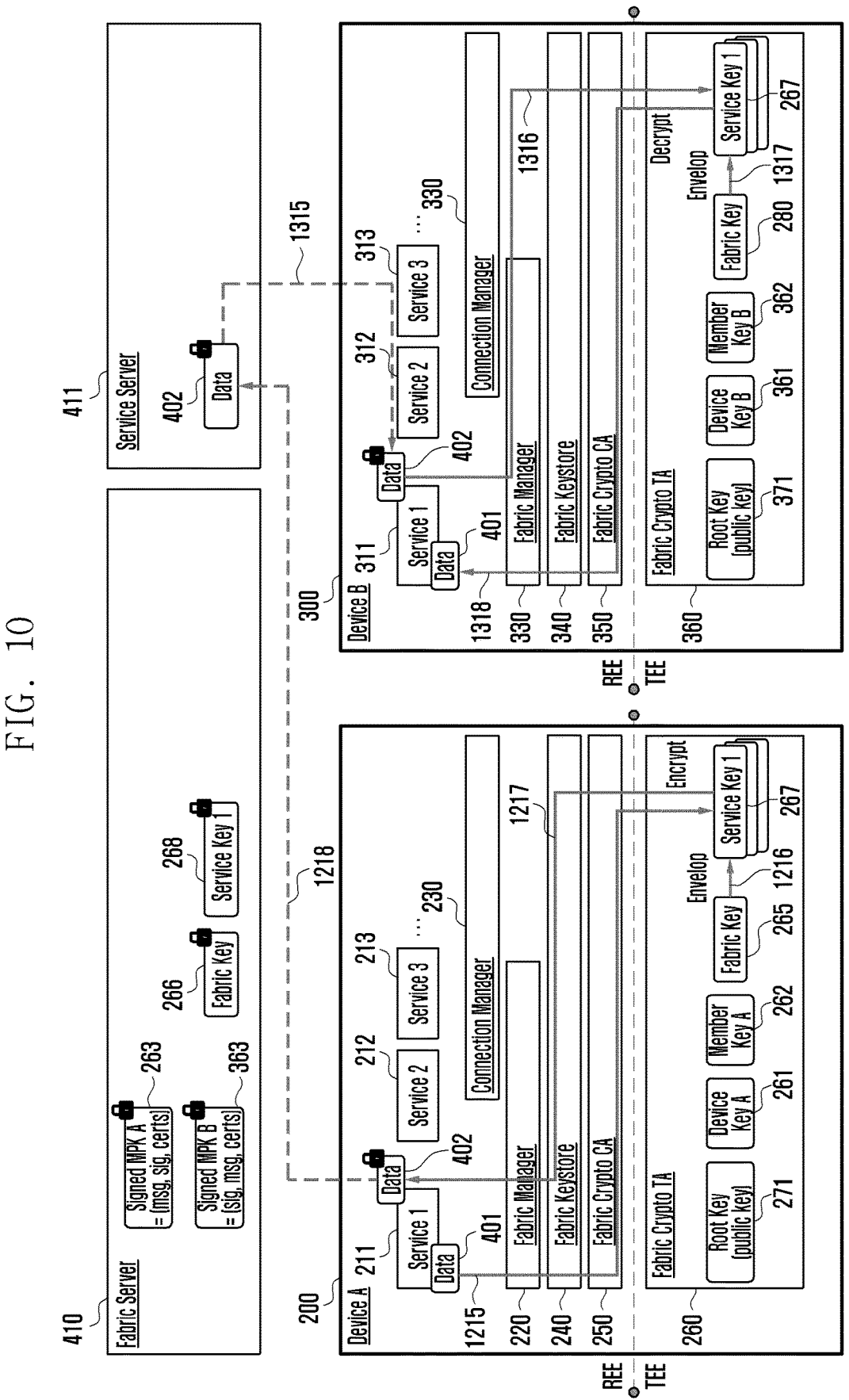
FIG. 10 is a conceptual diagram illustrating operations for backing up, recovering, and synchronizing data in a fabric network of a wireless communication system, according to an embodiment of the disclosure.

FIG. 10 is a conceptual diagram illustrating operations for backing up, recovering, and synchronizing data in a fabric network of a wireless communication system, according to an embodiment of the disclosure.

Referring to FIG. 10, in case of encrypting each service data corresponding to each service for backup and synchronization, the first electronic device 200 may encrypt each service data based on the service key corresponding to each service and transmit the encrypted service data to each of the service servers 411, 412, 413. The second electronic device

300 may receive the encrypted service data from the plurality of service servers 411, 412, and 413, and recover the encrypted service data based on the same service key as the service key.

In operation 1215, the first service function 211 of the first electronic device 200 may transmit to the fabric manager 220 a message requesting encryption of the data 401 related to the first service function 211. The fabric manager 220 may receive a message requesting the encryption of the data 401 related to the first service function 211 from the first service function 211. The fabric manager 220 may determine whether Service key 1 267 for the first service function 211 to encrypt the data 401 is stored. In case where Service key 1 267 is not stored, the fabric manager 220 may transmit a failure message to the first service function 211.

If Service key 1 267 is stored, the fabric manager 220 may transmit a message requesting encryption of the data 401 to the fabric key storage 240. The fabric key storage 240 may receive a message requesting the encryption for the data 401 from the fabric manager 220.

The fabric key storage 240 may transmit a message requesting encryption of the data 401 to the fabric crypto TA 260 through the fabric crypto CA 250. The fabric crypto TA 260 may receive a message requesting the encryption of the data 401 from the fabric key storage 240 through the fabric crypto CA 250.

In operation 1216, the fabric crypto TA 260 may encrypt the data 401 based on Service key 1 267. In operation 1217, the fabric manager 220 may transmit the encrypted data (encryptedData=Enc (serviceKey, data)) 402 to the first service function 211. The first service function 211 may receive the encrypted data 402 from the fabric manager 220. In operation 1218, the first service function 211 may transmit the encrypted data 402 to the first service server 411. The first service server 411 may receive the encrypted data 402 from the first service function 211. The first service server 411 may store the encrypted data 402 in a service DB.

In operation 1315, a first service function 311 of the second electronic device 300 may receive the encrypted data 402 from the first service server 411. In operation 1316, the first service function 311 may transmit a message requesting decryption of the encrypted data 402 to the fabric manager 320. The fabric manager 320 may receive a message requesting decryption of the encrypted data 402 from the first service function 311.

The fabric manager 320 may determine whether Service key 1 267 for the first service function 311 is stored to decrypt the data 401. If Service key 1 267 is not stored, the fabric manager 320 may transmit a failure message to the first service function 311.

If Service key 1 267 is stored, the fabric manager 320 may transmit a message requesting decryption of the data 402 to the fabric key storage 340. The fabric key storage 340 may receive a message requesting decryption of the data 402 from the fabric manager 320.

The fabric key storage 340 may transmit a message requesting decryption of the data 402 to the fabric crypto TA 360 through the fabric crypto CA 350. The fabric crypto TA 260 may receive a message requesting decryption of data 402 from the fabric key storage 340 through the fabric crypto CA 250.

In operation 1317, the fabric crypto TA 260 may decrypt the data 402 based on Service key 1 267. In operation 1318, the fabric manager 320 may transmit the decrypted data (data=Dec(serviceKey, encryptedData)) 402 to the first service function 311. The first service function 311 may receive the decrypted data 401 from the fabric manager 320.

Figure 11:
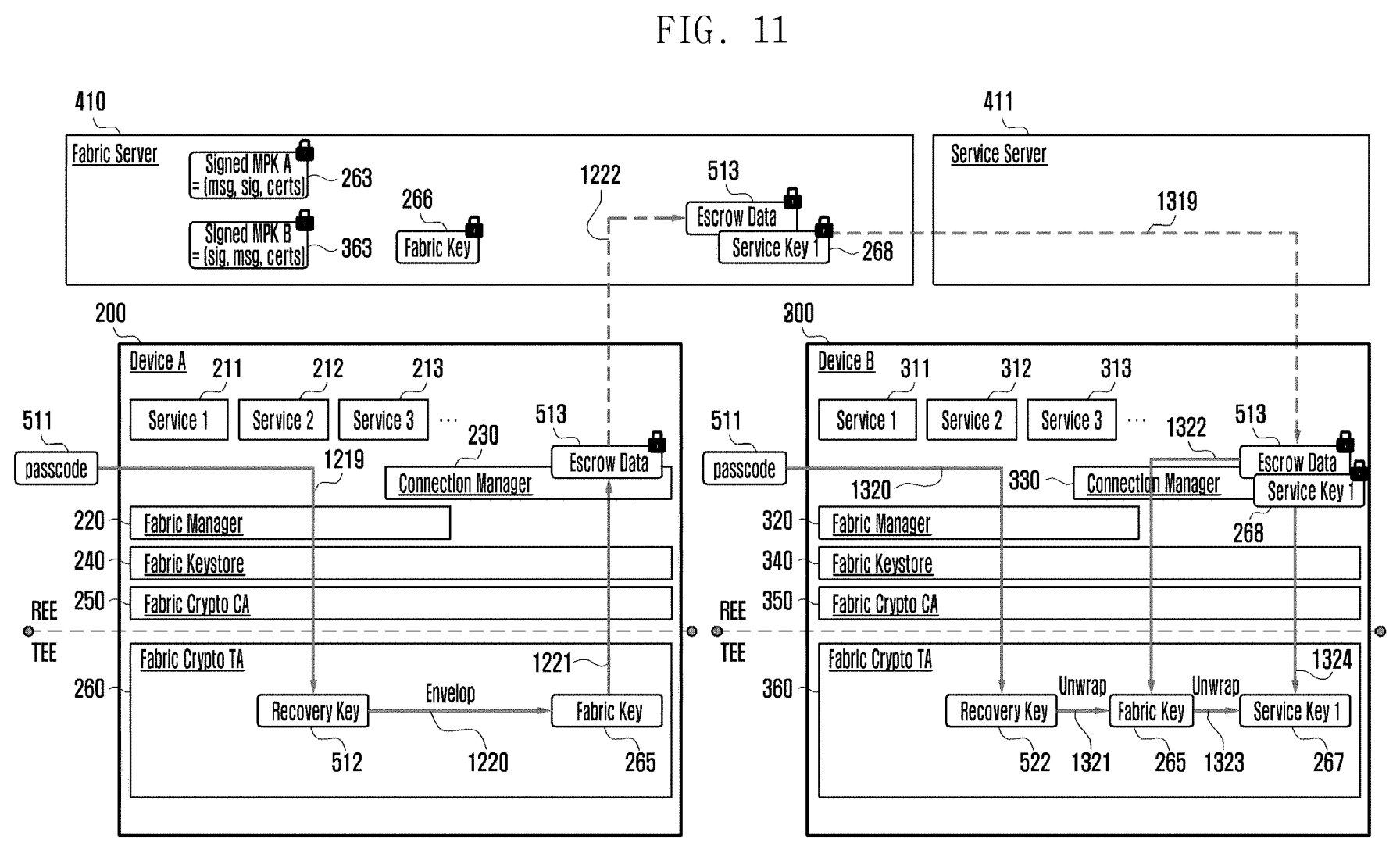

FIG. 11 is a conceptual diagram illustrating an operation for recovering an E2EE key for data in a fabric network of a wireless communication system, according to an embodiment of the disclosure.

Referring to FIG. 11, the first electronic device 200 may receive a passcode 511 from the user. For example, passcode 511 may be 28 characters. In operation 1219, the passcode 511 may be safely transmitted to the fabric crypto TA 260 through a text-based user interface (TUI). The fabric crypto TA 260 may receive the passcode 511 through the TUI. The fabric crypto TA 260 may generate a recovery key 512 based on the passcode 511. For example, it may be recoveryKey=KDF (passcode, salt).

In operation 1220, the fabric crypto TA 260 may encrypt the fabric key 265 based on the recovery key 512. The encrypted fabric key may be referred to as escrow data 513. For example, it may be escrow Data=Enc (recoveryKey, FabricKey).

In operation 1221, the fabric crypto TA 260 may transmit the escrow data 513 to the connection manager 230. The connection manager 230 may receive the escrow data 513 from the fabric crypto TA 260.

In operation 1222, the connection manager 230 may transmit the escrow data 513 to the fabric server 110. The fabric server 410 may receive the escrow data 513 from the connection manager 230.

In operation 1319, the connection manager 320 of the second electronic device 300 may receive the escrow data 513 and encrypted service key 1 268 from the fabric server 410 through the first service server 111. The external electronic device 104 may receive a passcode 521 from the user. For example, the passcode 521 may be 28 characters. The passcode 521 may be the same as the passcode 511.

In operation 1320, the fabric crypto TA 360 may generate a recovery key 522 based on the passcode 521. For example, it may be recoveryKey=KDF (passcode, salt). In operation 1321, the fabric crypto TA 360 may recover the fabric Key 265 based on the recovery key 522. For example, it may be fabricKey=Enc (recoveryKey, escrowData). In operation 1322, the fabric crypto TA 360 may recover the escrow data 513 to the fabric key 265 based on the recovery key 522. In operations 1323 and 1324, the fabric crypto TA 360 may recover the encrypted service key 1 268 into Service key 1 267 based on the fabric key 265. For example, it may be serviceKey=Enc (fabricKey, envelopedServiceKey).

The second electronic device 300 may recover the escrow data 513 received from the fabric server 410 as the fabric key 265 based on the passcode 521 even if the first electronic device 200 is lost.

Figure 12:
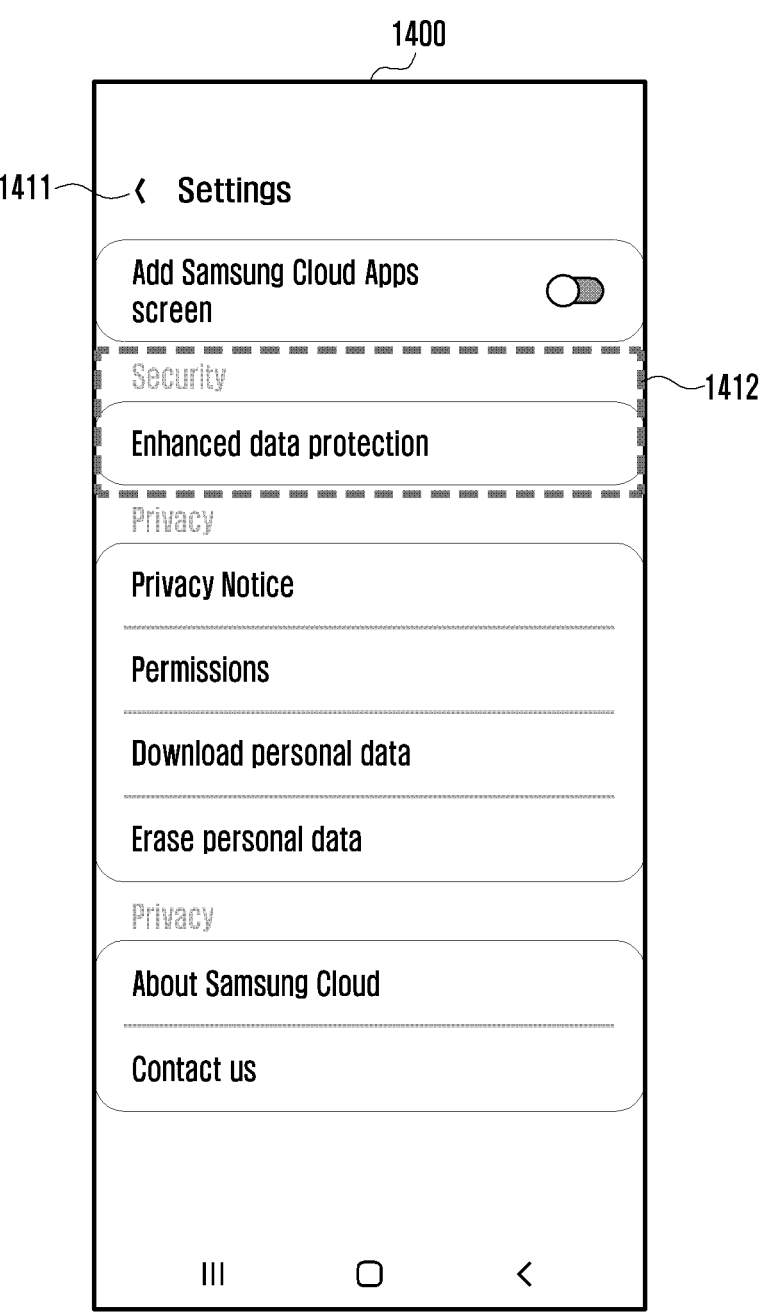
FIG. 12 is a conceptual diagram illustrating a user interface of a first electronic device for turning on/off an E2EE function in a fabric network of a wireless communication system according to an embodiment of the disclosure.

FIG. 12 is a conceptual diagram illustrating a user interface of a first electronic device for turning on/off an E2EE function in a fabric network of a wireless communication system, according to an embodiment of the disclosure.

Figure 15:
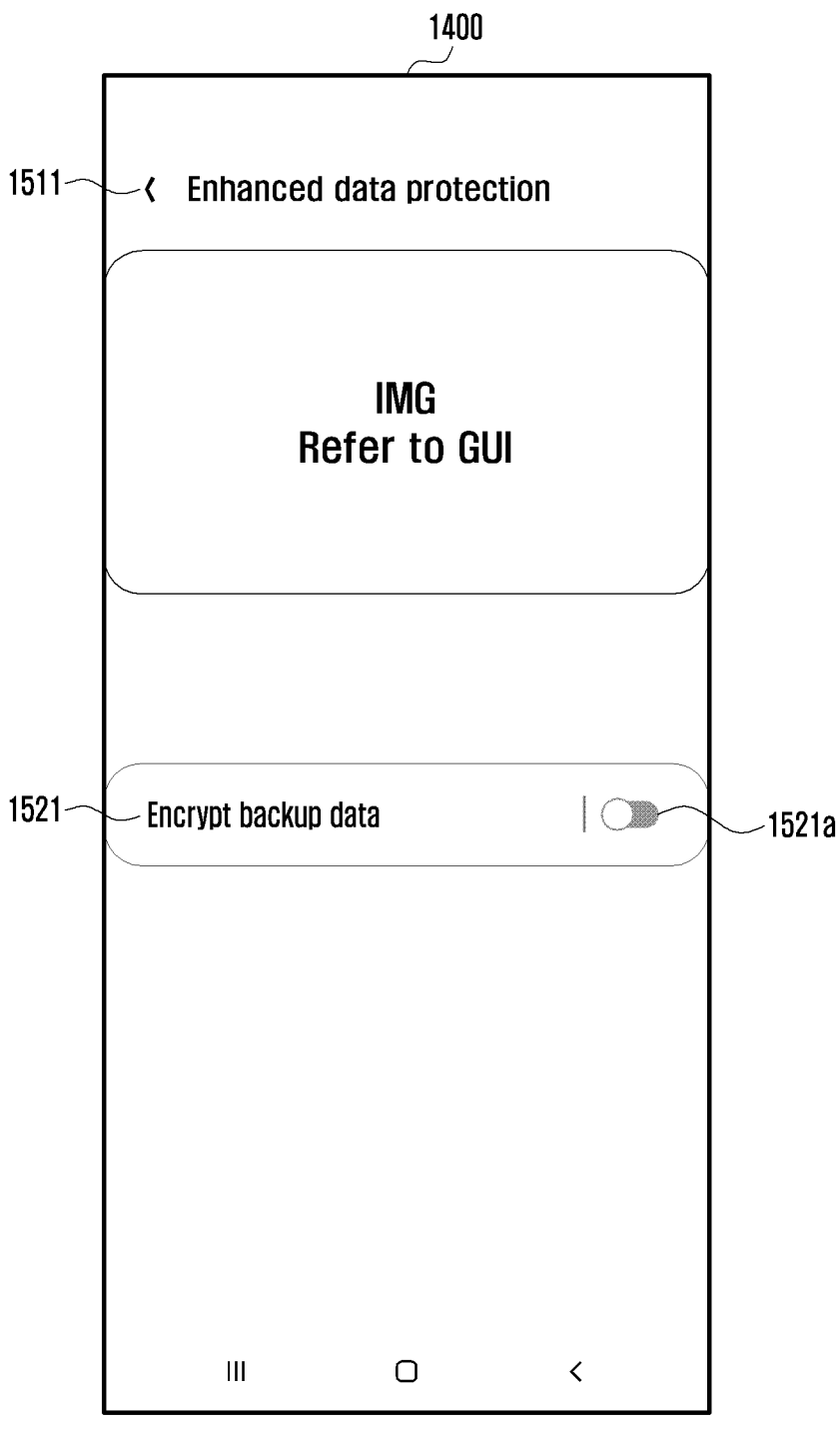
FIGS. 15, 16, and 17 are conceptual diagrams illustrating a user interface of a first electronic device for configuring an E2EE function in a fabric network of a wireless communication system according to various embodiments of the disclosure.
Figure 16:
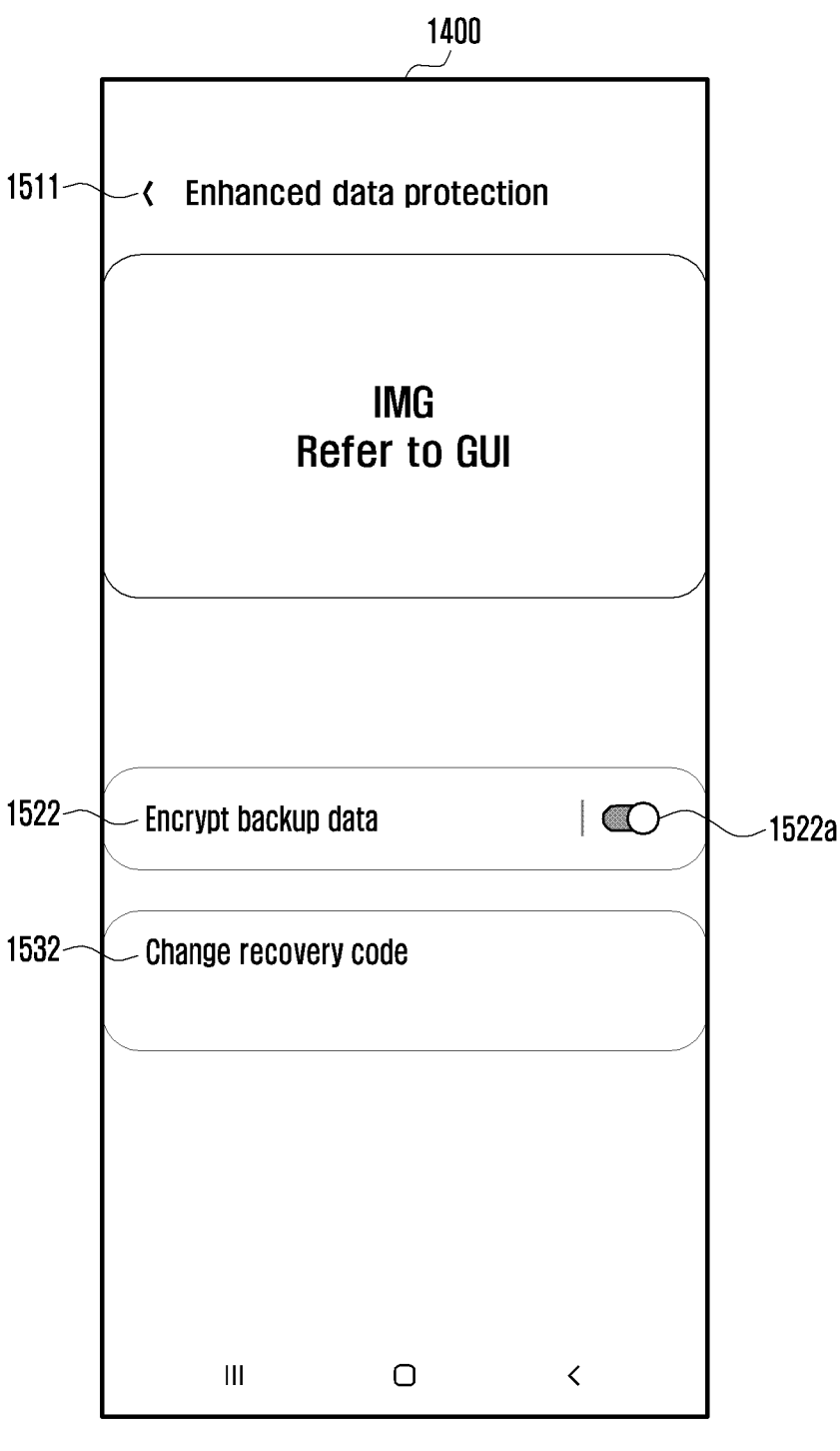
Figure 17:
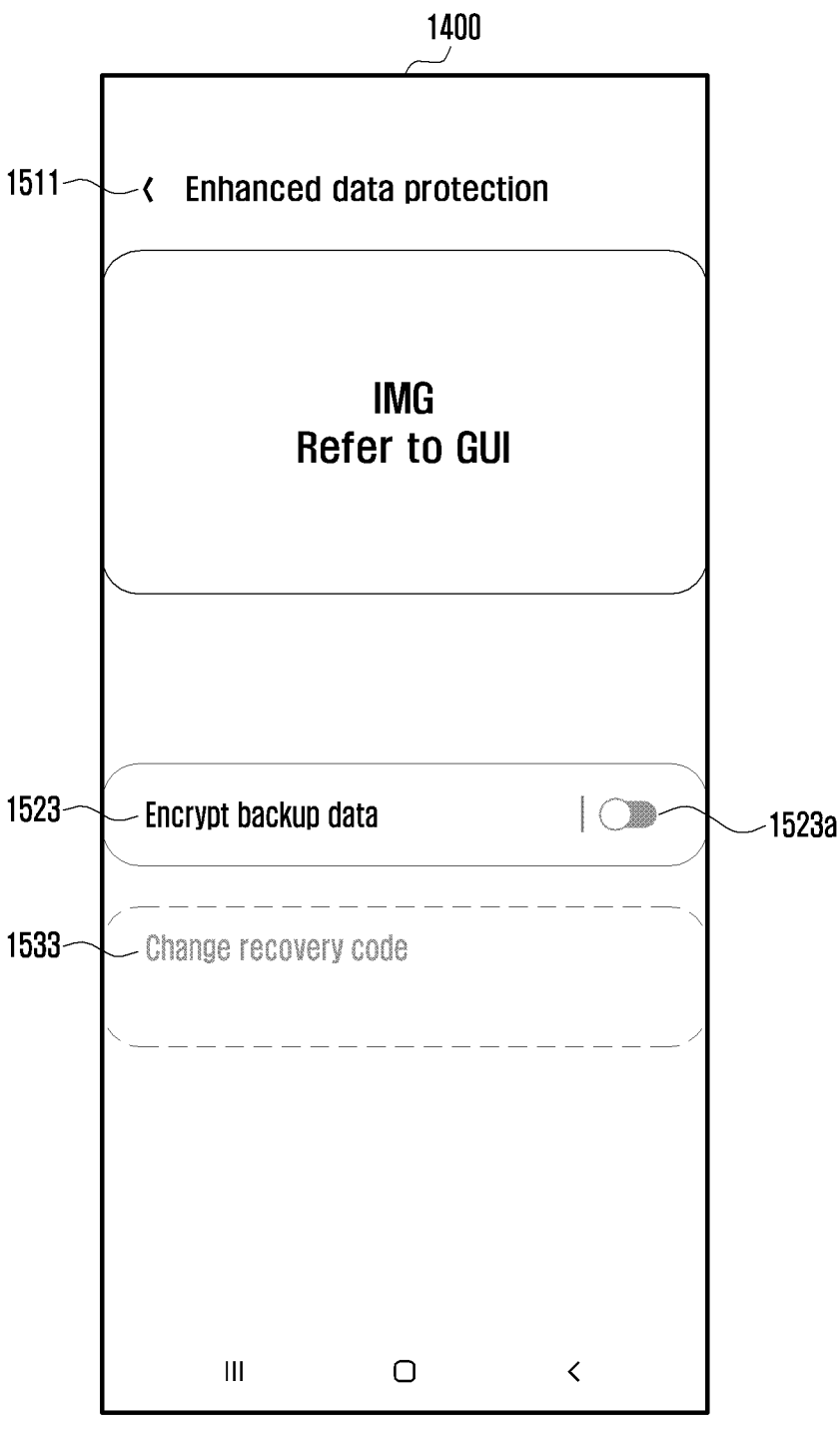

Referring to FIG. 12, the first electronic device 200 may display a user interface 400 on a display. The user interface 400 may display a settings 1411 menu. The settings 1411 menu may display various items related to settings, including an enhanced data protection item 1412. The enhanced data protection item 1412 may correspond to the E2EE function according to the disclosure. The first electronic device 200 may turn on the E2EE function in case where a selection input for the enhanced data protection item 1412 is detected on the display. Alternatively, the first electronic device 200 may display a user interface for setting the E2EE function in case where a selection input for the enhanced data protection item 1412 is detected through the display module. For example, the user interface for setting the E2EE function may be as shown in FIGS. 15 to 17.

Figure 13:
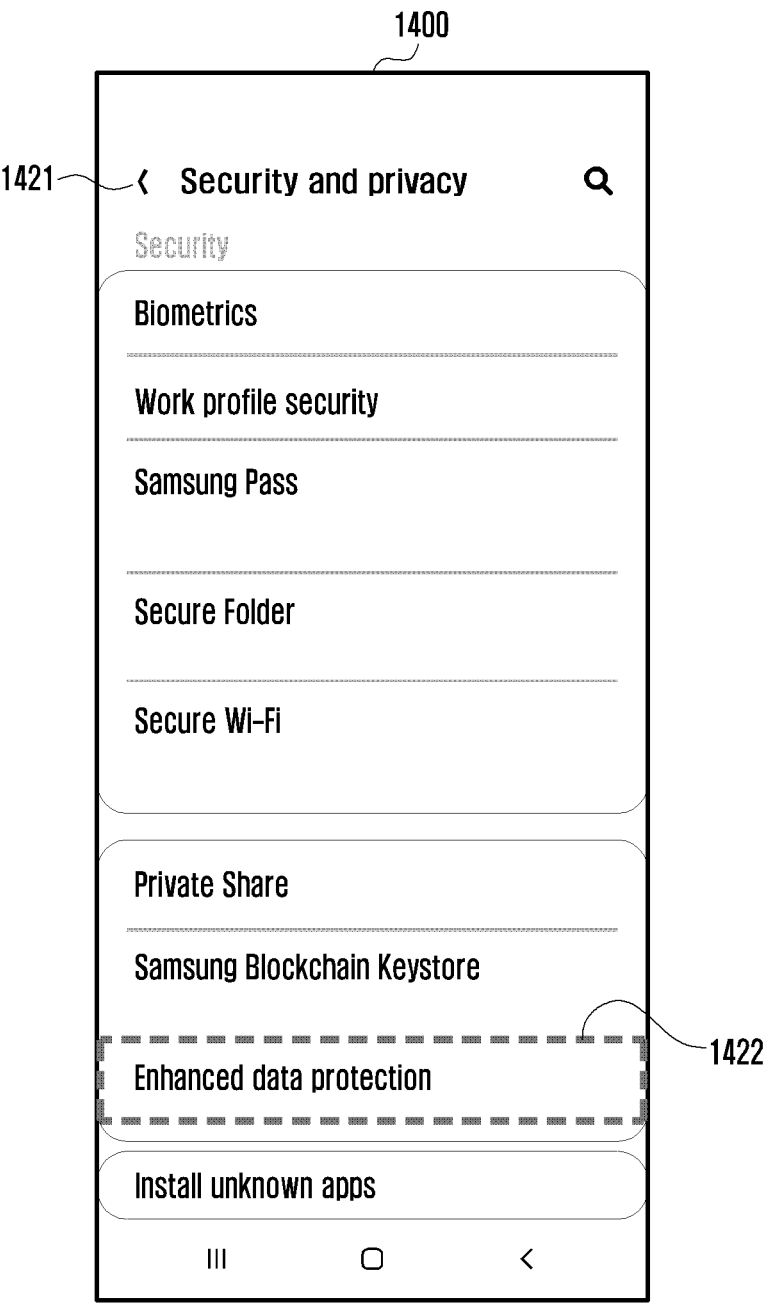
FIG. 13 is a conceptual diagram illustrating a user interface of a first electronic device for turning on/off an E2EE function in a fabric network of a wireless communication system according to an embodiment of the disclosure.

FIG. 13 is a conceptual diagram illustrating a user interface of a first electronic device for turning on/off an E2EE function in a fabric network of a wireless communication system according to an embodiment of the disclosure.

Referring to FIG. 13, the first electronic device 200 may display a user interface 1400 on the display. The user interface 1400 may display a security and privacy 1421 menu. The security and privacy 1421 menu may display various items related to security and privacy, including an enhanced data protection item 1422. The enhanced data protection item 1412 may correspond to the E2EE function according to the disclosure. The first electronic device 200 may turn on the E2EE function in case where a selection input for the enhanced data protection 422 item is detected on the display. Alternatively, the first electronic device 200 may display a user interface for setting the E2EE function in case where a selection input for the enhanced data protection item 1412 is detected through the display module. For example, the user interface for setting the E2EE function may be as shown in FIGS. 15 to 17.

Figure 14:
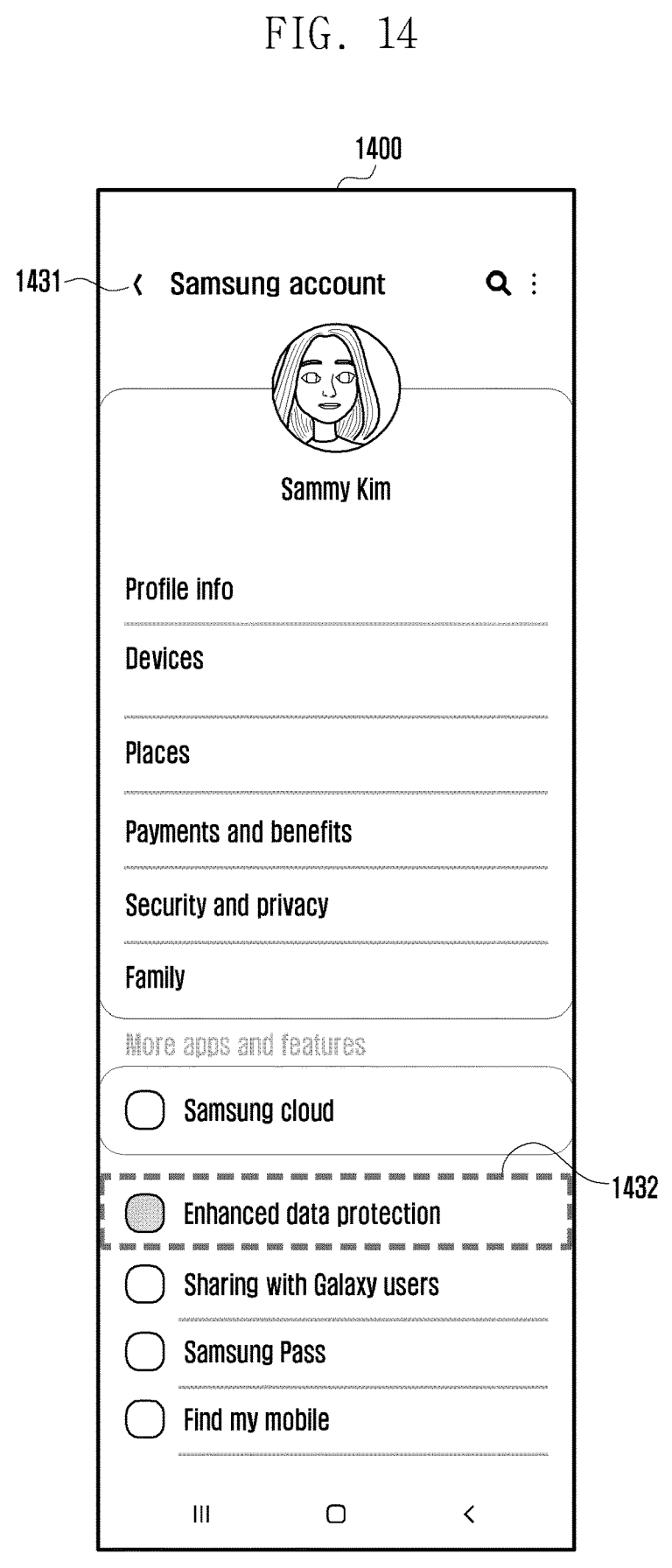

FIG. 14 is a conceptual diagram illustrating a user interface of a first electronic device for turning on/off an E2EE function in a fabric network of a wireless communication system according to an embodiment of the disclosure.

Referring to FIG. 14, the first electronic device 200 may display the user interface 1400 on the display. The user interface 1400 may display a user account 1431 menu. The user account 1431 menu may display various items related to the user account, including an enhanced data protection item 1432. The enhanced data protection item 1432 may correspond to the E2EE function according to the disclosure. The first electronic device 200 may turn on the E2EE function in case where a selection input for the enhanced data protection item 1432 is detected on the display. Alternatively, the first electronic device 200 may display a user interface for setting the E2EE function in case where a selection input for the enhanced data protection item 1432 is detected on the display. For example, the user interface for setting the E2EE function may be as shown in FIGS. 15 to 17.

FIGS. 15, 16, and 17 are conceptual diagrams illustrating a user interface of a first electronic device for configuring the E2EE function in a fabric network of a wireless communication system according to various embodiments of the disclosure.

Referring to FIG. 15, the first electronic device 200 may display the user interface 1400 on the display. The user interface 1400 may display an interface 1511 for settings related to enhanced data protection. The enhanced data protection may correspond to the E2EE function according to the disclosure.

For example, the first electronic device 200 may display an interface 1511 for settings related to the enhanced data protection in case where a selection input for the enhanced data protection item 1412 in FIG. 12 is detected, or in a case where a selection input for the enhanced data protection item 1422 in FIG. 13 is detected, or in case where a selection input for the enhanced data protection item 1432 in FIG. 14 is detected.

The interface 1511 for settings related to the enhanced data protection may include a backup data encryption item 1521. The backup data encryption item 1521 may include an activation/deactivation indicator 1521*a*. For example, in case where the interface 1511 for settings related to the enhanced data protection is initially displayed, the activation/deactivation indicator 1521*a* may indicate a deactivation state. In case where a selection input for the backup data encryption item 1521 is detected, the first electronic device 200 may control the activation/deactivation indicator 1521*a* to display an activation state.

Referring to FIG. 16, in case where a selection input for the backup data encryption item 1522 is detected, the first electronic device 200 may control the activation/deactivation indicator 1522*a* to display an activation state. In case where a selection input for the backup data encryption item 1522 is detected, the first electronic device 200 may display a change recovery code 1532 item. In case where a selection input for the change recovery code 1532 item is detected, the first electronic device 200 may display a user interface for changing the recovery code.

Referring to FIG. 17, in case where a deselection input for the backup data encryption item 1522 is detected, the first electronic device 200 may control the activation/deactivation indicator 1522*a* to display a deactivated state. In case where a deselection input for the backup data encryption item 1522 is detected, the first electronic device 200 may shade a change recovery code 1533 item. In case where a deselection input for the backup data encryption item 1522 is detected, the first electronic device 200 may control the change recovery code 1533 item to be deactivated.

Figure 18:
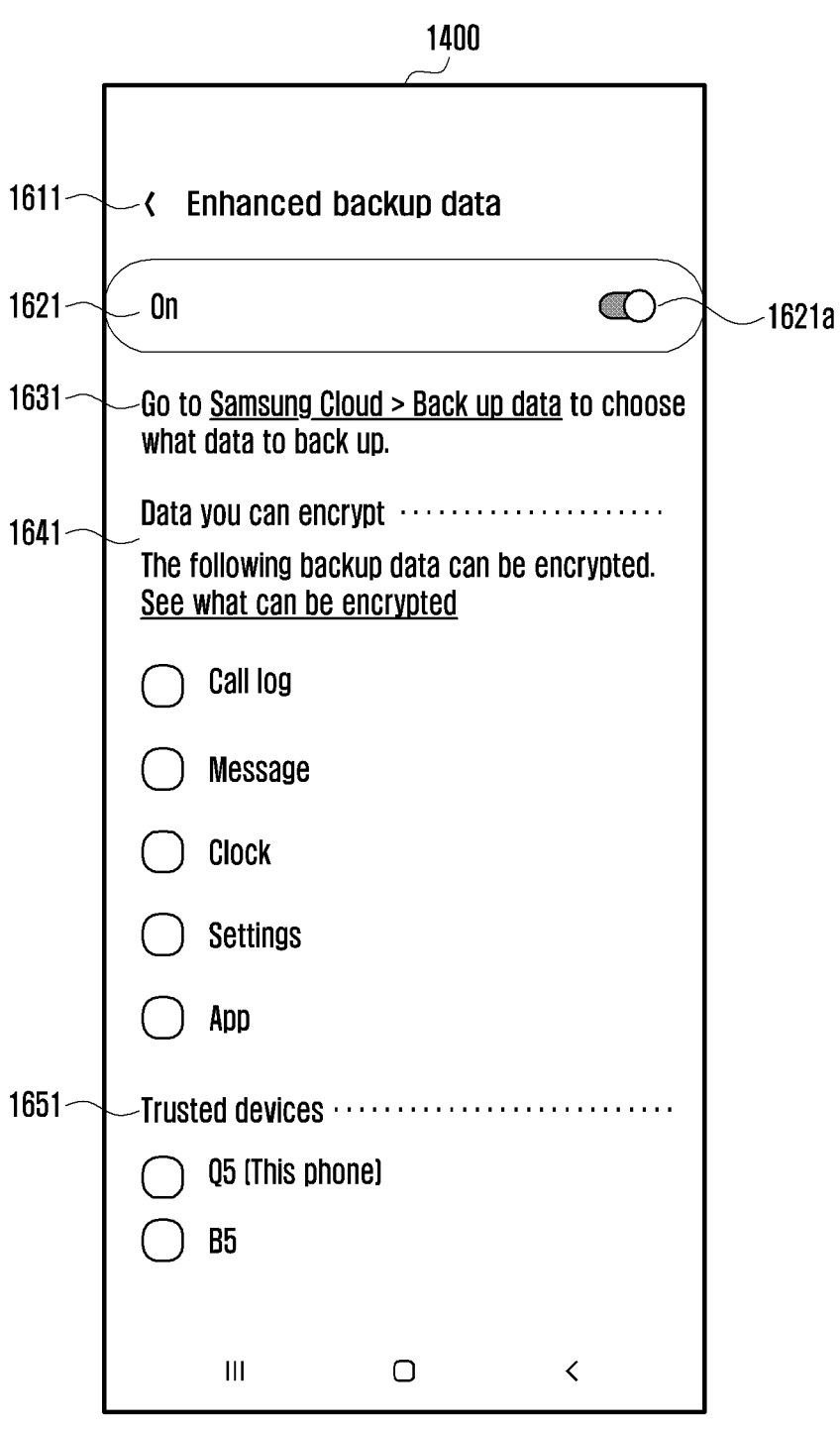
FIGS. 18, 19, and 20 are conceptual diagrams illustrating a user interface of a first electronic device for encrypting backup data among E2EE functions in a fabric network of a wireless communication system according to various embodiments of the disclosure.
Figure 19:
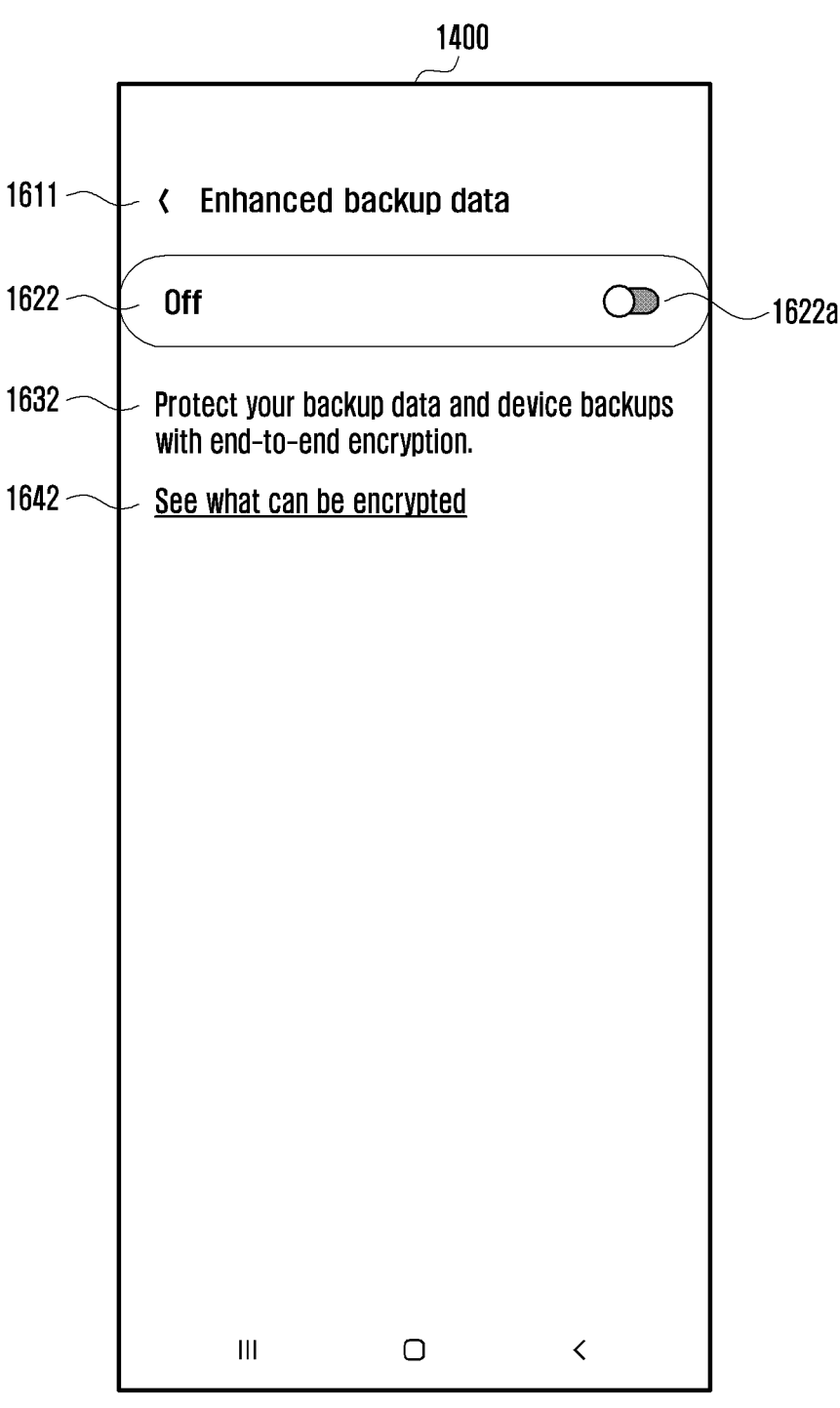
Figure 20:
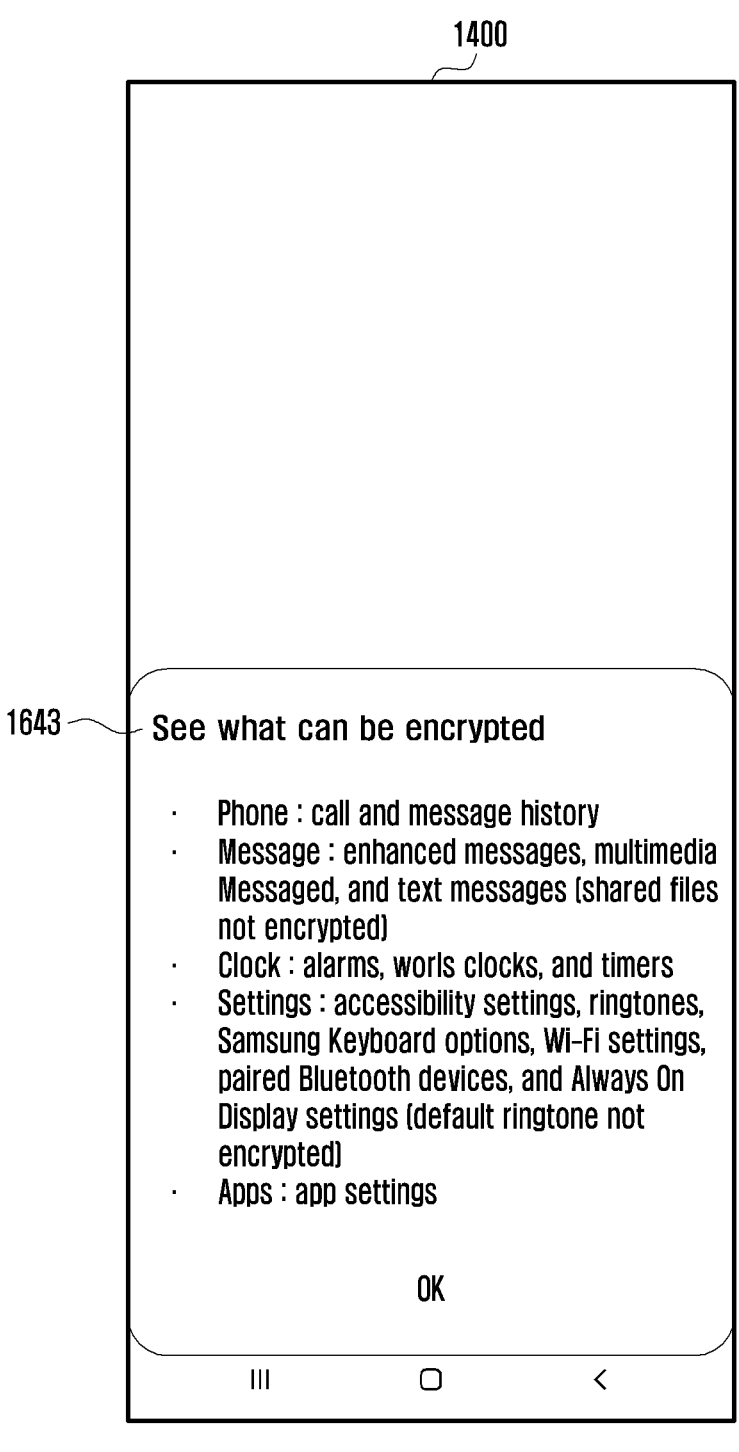

FIGS. 18, 19, and 20 are conceptual diagrams illustrating a user interface of a first electronic device for encrypting backup data among an E2EE functions in a fabric network of a wireless communication system according to various embodiments of the disclosure.

Referring to FIG. 18, the first electronic device 200 may display the user interface 1400 on the display. The user interface 1400 may display an interface 1611 for settings related to backup data encryption.

For example, the first electronic device 200 may display the interface 1611 for settings related to backup data encryption in case where a selection input for the backup data encryption item 1521 in FIG. 15 is detected, or in case where a selection input for the backup data encryption item 1522 in FIG. 16 is detected, or in case where a selection input for the backup data encryption item 1523 in FIG. 17 is detected.

The interface 1611 for settings related to backup data encryption may include an on/off display item 1621, a description link 1631, an encryptable data item 1641, and a trustworthy device list 1651.

The on/off display item 1621 may indicate whether the backup data encryption function is on/off. The on/off display item 1621 may include an on/off indicator 1621*a*. The on/off indicator 1621*a* may indicate an activation state in case where the backup data encryption function is on.

The description link 1631 may link to the description related to the backup data encryption. For example, in case where a selection input for the description link 1631 is detected, the first electronic device 200 may display the description related to backup data encryption on the display.

The encryptable data item 1641 may include a name and icon associated with at least one piece of data that may be encrypted. For example, the encryptable data may include call logs, messages, clocks, settings, and applications.

The trustworthy device list 1651 may include a name and icon associated with at least one trustworthy device. For example, the at least one trustworthy device may be a device that shares the E2EE service according to the disclosure with the first electronic device 200 through a fabric network.

Referring to FIG. 19, in case where an input for deselecting the on/off display item 1621 in FIG. 18 is detected, the first electronic device 200 may display that the on/off display item 1622 indicates the backup data encryption function being off. The on/off display item 1622 may include an on/off indicator 1622a. The on/off indicator 1622a may indicate a deactivated state in case where the backup data encryption function is off.

The interface 1611 for settings related to backup data encryption may include a description 1632 and encryptable data link 1642 related to the backup data encryption.

The description 1632 related to backup data encryption may display a description related to the backup data encryption.

The encryptable data link 1642 may link to a list associated with data that can be encrypted. For example, in case where a selection input for the encryptable data link 1642 is detected, the first electronic device 200 may display a list 1643 related to encryptable data in FIG. 20.

Referring to FIG. 20, in case where a selection input for the encryptable data link 1642 in FIG. 19 is detected, the first electronic device 200 may display a list 1643 related to encryptable data. The list 1643 related to encryptable data may include items and details related to at least one encryptable data.

FIGS. 21, 22, 23, and 24 are conceptual diagrams illustrating a user interface of a first electronic device for setting up a recovery code among an E2EE functions in a fabric network of a wireless communication system according to various embodiments of the disclosure.

Figure 21:
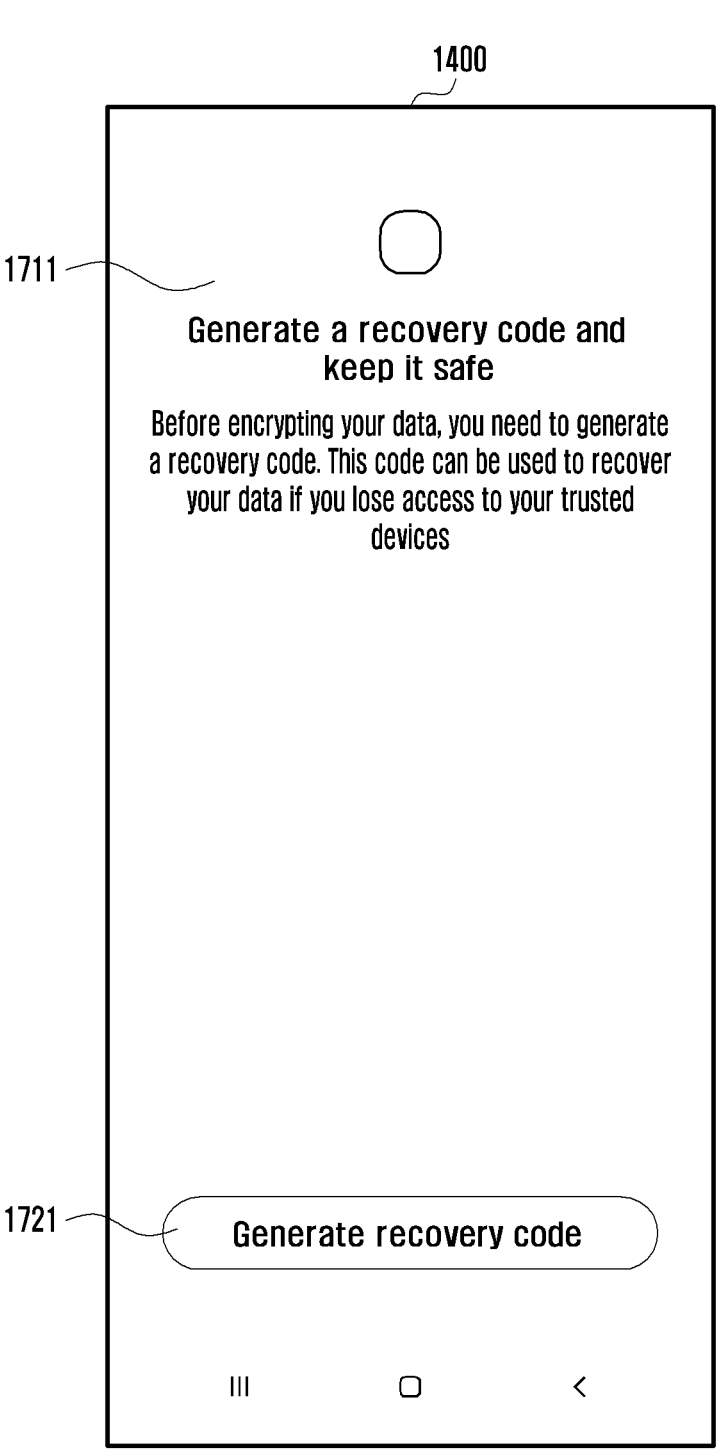
FIGS. 21, 22, 23, and 24 are conceptual diagrams illustrating a user interface of a first electronic device for setting up a recovery code among E2EE functions in a fabric network of a wireless communication system according to various embodiments of the disclosure.

Referring to FIG. 21, the first electronic device 200 may display a user interface 1711 for setting up a recovery code using a display module. The user interface 1711 for setting up a recovery code may display a description related to the recovery code. The user interface 1711 for setting up a recovery code may include a button 1721 for generating a recovery code. The first electronic device 200 may detect a selection input to the button 1721 for generating multiple codes. In case where a selection input for the button 1721 for generating a recovery code is detected, the first electronic device 200 may display a user interface 1712 for generating a recovery code as shown in FIG. 22.

Figure 22:
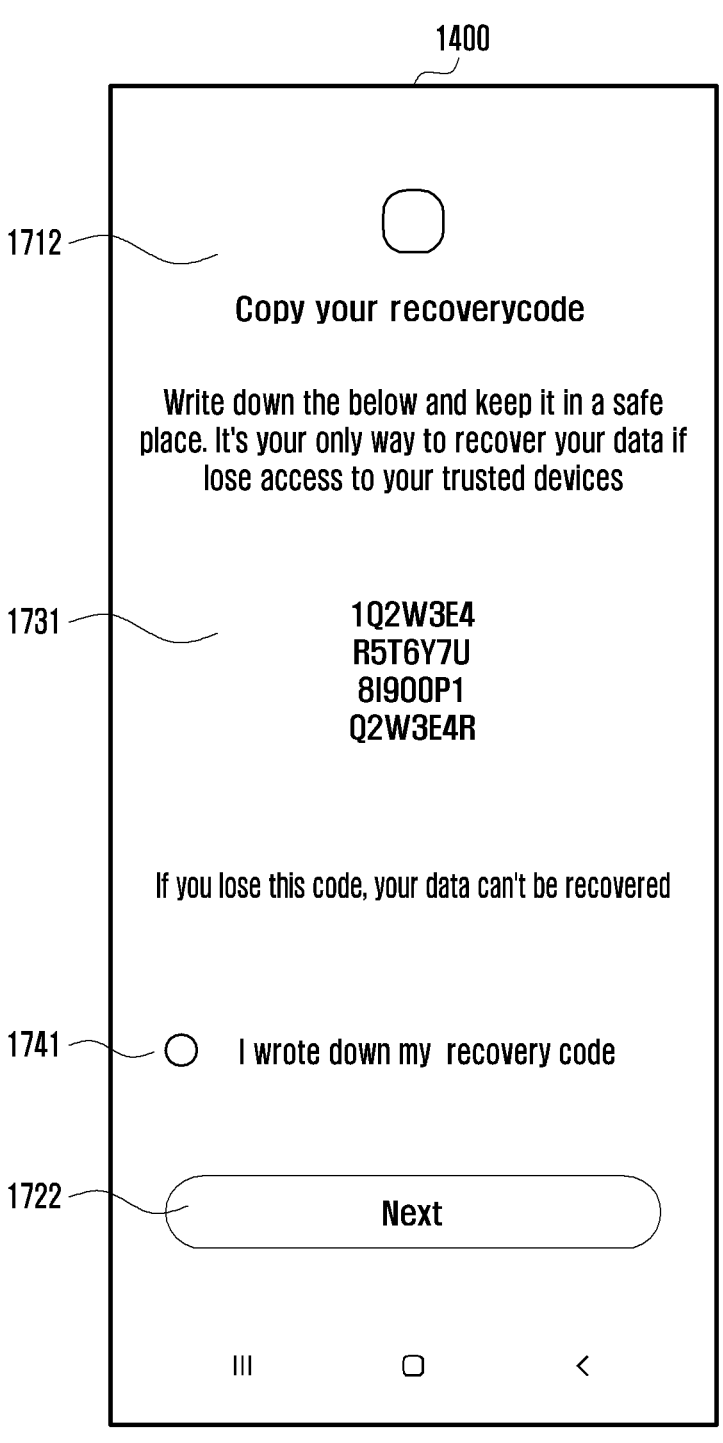

Referring to FIG. 22, the user interface 1712 for generating a recovery code may include a recovery code 1731, a recovery code copy completion display item 1741, and a button 1722 to proceed to the next operation.

The recovery code 1731 may include a plurality of letters and a plurality of numbers. For example, recovery code 1731 may be 28 characters and/or numbers. The recovery code copy completion display item 1741 may indicate whether copying of the recovery code 1731 has been completed. For example, in case where a selection input for the recovery code copy completion display item 1741 is detected, the first electronic device 200 may display that the recovery code copy completion display item 1741 indicates the completion of the copying of the recovery code 1731. In case where a selection input for the recovery code copy completion display item 1741 is detected, the first electronic device 200 may activate the button 1722 for proceeding to the next operation.

The button 1722 for proceeding to the next operation may be activated in case where a selection input for the recovery code copy completion display item 1741 is detected. In case where a selection input for the button 1722 for proceeding to the next step is detected, the first electronic device 200 may display a user interface 1713 for confirming the recovery code as shown in FIG. 23.

Figure 23:
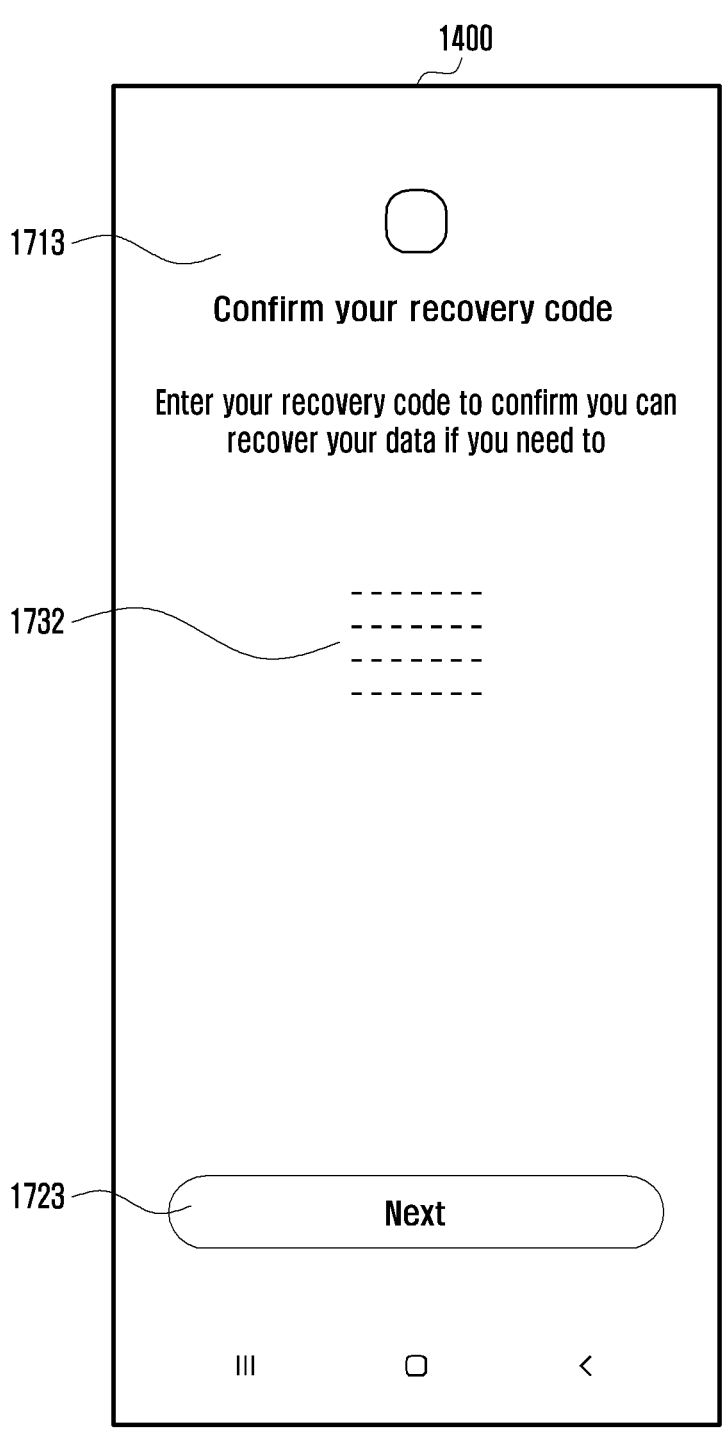

Referring to FIG. 23, the user interface 1713 for confirming the recovery code may include a recovery code confirmation input window 732 and a next operation button 1723 for proceeding to the next operation. A recovery code confirmation input window 1732 may be an interface for entering a code corresponding to the recovery code 1731. The next operation button 1723 may be activated in case where a code is entered into the recovery code confirmation input window 1732. The first electronic device 200 may detect a selection input for the next operation button 1723. The first electronic device 200 may perform the operation in FIG. 11 in case where a selection input for the next operation button 1723 is detected and a code matching the recovery code 1731 is entered in the recovery code confirmation input window 1732. The recovery code 1731 may correspond to the passcode 511 in FIG. 11.

Figure 24:
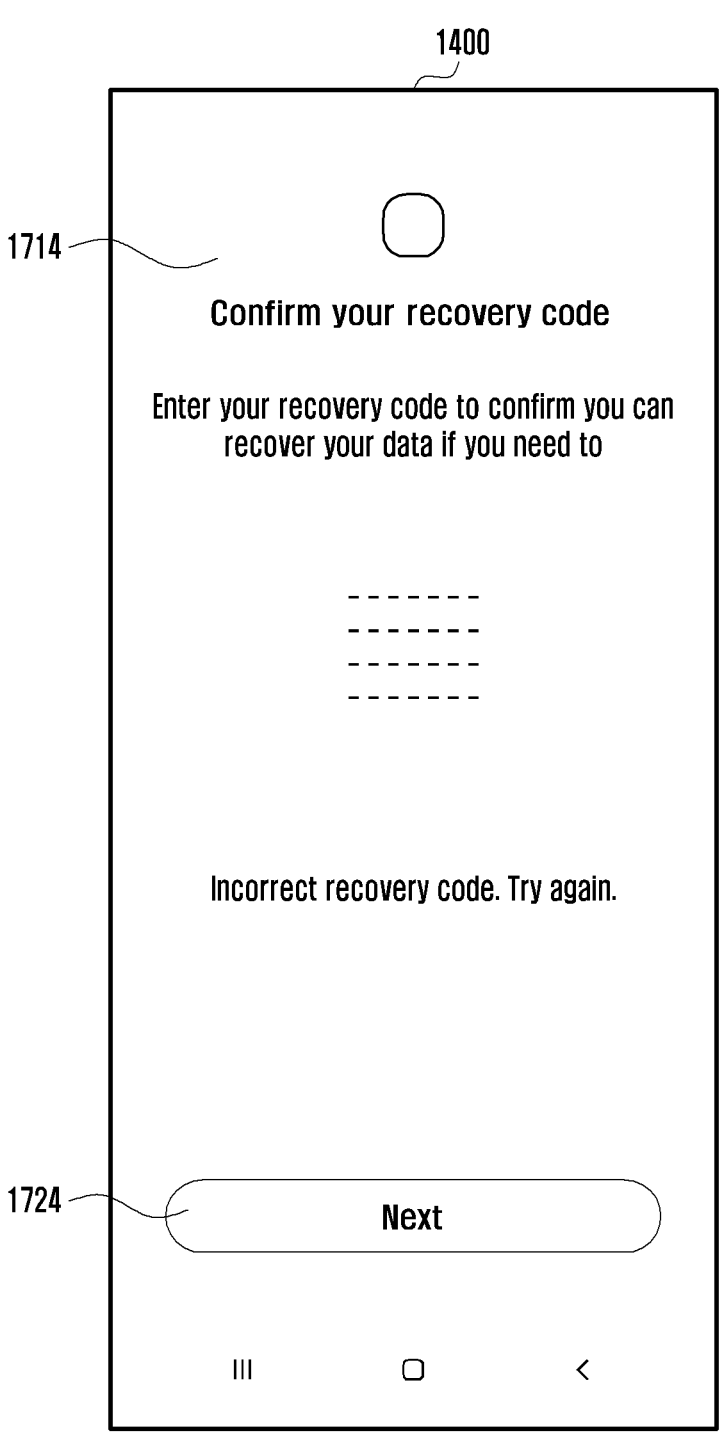

In case where a selection input for the next operation button 1723 is detected but a code that does not match the recovery code 1731 is entered in the recovery code confirmation input window 1732, the first electronic device 200, as shown in FIG. 24, may display a user interface 1714 indicating that the entered recovery code is an error.

Referring to FIG. 24, the user interface 1714 indicating that the entered recovery code is an error may include a recovery code re-confirmation input window 1733 and a next operation button 1724 to proceed to the next operation. The recovery code re-confirmation input window 1733 may be displayed with a message indicating that the code entered in the recovery code confirmation input window 1732 in FIG. 23 does not match the recovery code 1731 and instructing to re-enter a code. The next operation button 1724 may be activated in case where a code is entered into the recovery code re-confirmation input window 1733. The first electronic device 200 may detect a selection input for the next operation button 1724. The first electronic device 200 may perform the operation in FIG. 11 in case where a selection input for the next operation button 1724 is detected and a code matching the recovery code 1731 is entered in the recovery code re-confirmation input window 1733. The recovery code 1731 may correspond to the passcode 511 in FIG. 11.

In case where a selection input for the next operation button 1723 is detected, but a code that does not match the recovery code 1731 is entered in the recovery code confirmation input window 1732, the first electronic device 200 may terminate the confirmation for the recovery code and the user interface 1714 indicating that the entered recovery code is an error.

Figure 25:
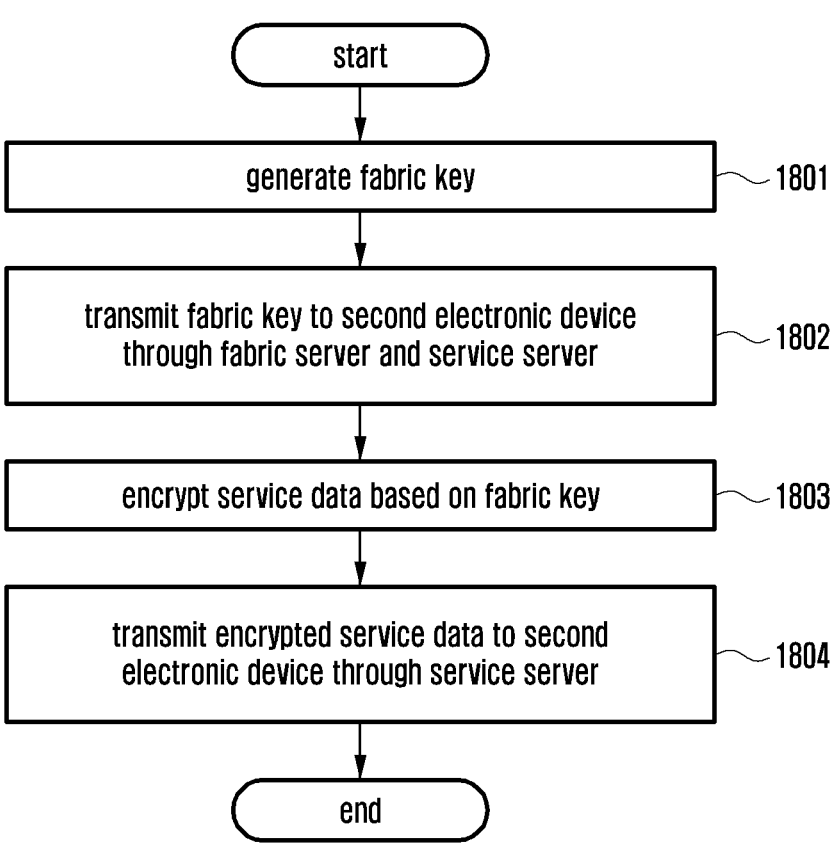
FIG. 25 is a flowchart illustrating an operation of a first electronic device in a fabric network of a wireless communication system according to an embodiment of the disclosure.

FIG. 25 is a flowchart illustrating an operation of a first electronic device in a fabric network of a wireless communication system according to an embodiment of the disclosure.

Referring to FIG. 25, in operation 1801, the first electronic device 200 may generate a fabric key based on the pre-stored first device key and the second member key received from the second electronic device 300. In operation 1802, the first electronic device 200 may transmit the fabric key to the second electronic device 300 through the fabric server 410, which manages the fabric network, and the first service server 411, which manages the service data. In operation 1803, the first electronic device 200 may encrypt the service data based on the fabric key. In operation 1804, the first electronic device 200 may transmit the encrypted data to the second electronic device 300 through the service server. The fabric key may be shared with the fabric server 410, which is a member entity of the fabric network, and the second electronic device 300. The encrypted data may be decryptable at the member entities of the fabric network that share the fabric key.

The first electronic device 200 may generate a first member key indicating that the first electronic device 200 is a member receiving an E2EE service based on the first device key.

The first member key may be transmitted to the fabric server 410.

The first member key may be transmitted to the second electronic device 300 through the fabric server 410 and first service server 411.

The first electronic device 200 may generate a link key based on the first member key and second member key.

The fabric key may be generated based on the link key.

The first electronic device 200 may generate a service key associated with the service data based on the fabric key.

The service key may be transmitted to the second electronic device 300 through the fabric server 410 and first service server 411.

The service key may be stored in the fabric server 410.

The service data may be encrypted based on the service key.

The operation of the second electronic device 300 corresponding to the first electronic device 200 may be as follows.

The second electronic device 300 may generate a second member key based on a pre-stored second device key. The second electronic device 300 may transmit the second member key to the first electronic device 200 through the fabric server 410, which manages the fabric network, and the first service server 411, which manages service data. The second electronic device 300 may receive the fabric key generated based on the second member key and first member key of the first electronic device 200 from the first electronic device 200 through the fabric server 410 and first service server 411. The second electronic device 300 may receive service data encrypted based on the fabric key from the first electronic device 200 through the first service server 411. The second electronic device 300 may decrypt the encrypted service data based on the fabric key.

The fabric key may be stored in the fabric server 410, which is a member entity of the fabric network, and the second electronic device 300.

The encrypted data may be decryptable at the member entities of the fabric network that share the fabric key.

The second member key may be generated based on a pre-stored second device key.

The second member key may indicate that the second electronic device 300 is a member entity provided with an E2EE service.

A second electronic device that controls to generate a link key based on the first member key and second member key.

The fabric key may be decrypted with the link key.

The second electronic device 300 may receive a service key associated with the service data generated by the first electronic device 200 based on the fabric key from the first electronic device 200.

The service key may be received from the first electronic device 200 through the fabric server 410 and first service server 411.

The service key may be stored in the fabric server 410.

The service data may be decrypted based on the service key.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a first electronic device which is connected to a fabric network supporting end-to-end encryption (E2EE) in a wireless communication system, the method comprising:

generating a fabric key based on a pre-stored first device key and a second member key received from a second electronic device;

transmitting the fabric key to the second electronic device through a fabric server, which manages the fabric network, and a service server, which manages service data;

encrypting service data based on the fabric key; and transmitting the encrypted data to the second electronic device through the service server, wherein the fabric key is shared with the fabric server, which is a member entity of the fabric network, and the second electronic device, and wherein the encrypted data is decryptable at a member entity of the fabric network that shares the fabric key.

2. The method of claim 1, further comprising:

generating a first member key indicating that the first electronic device is a member provided with an E2EE service based on the first device key.

3. The method of claim 2, wherein the first member key is transmitted to the fabric server.

4. The method of claim 2, wherein the first member key is transmitted to the second electronic device through the fabric server and the service server.

5. The method of claim 2, further comprising:

generating a link key based on the first member key and the second member key.

6. The method of claim 5, wherein the fabric key is generated based on the link key.

7. The method of claim 6, further comprising:

generating a service key associated with the service data based on the fabric key.

8. The method of claim 7, wherein the service key is transmitted to the second electronic device through the fabric server and the service server, wherein the service key is stored in the fabric server.

9. The method of claim 7, wherein the service data is encrypted based on the service key.

10. A method of a second electronic device which is connected to a fabric network supporting end-to-end encryption (E2EE) in a wireless communication system, the method comprising:

generating a second member key based on a pre-stored second device key;

transmitting the second member key to a first electronic device through a fabric server, which manages the fabric network, and a service server, which manages service data;

receiving a fabric key generated based on the second member key and a first member key of the first electronic device from the first electronic device through the fabric server and the service server;

receiving service data encrypted based on the fabric key from the first electronic device through the service server;

decrypting the encrypted service data based on the fabric key; and generating a link key based on the first member key and the second member key.

11. The method of claim 10, wherein the fabric key is stored in the fabric server, which is a member entity of the fabric network, and the second electronic device, and wherein the encrypted data is able to be decrypted by a member entity of the fabric network which shares the fabric key.

12. The method of claim 10, wherein the second member key indicates that a second electronic device is a member provided with E2EE service.

13. The method of claim 10, wherein the fabric key is decrypted with the link key.

14. The method of claim 13, further comprising:

receiving a service key associated with the service data generated by the first electronic device based on the fabric key from the first electronic device.

15. The method of claim 14, wherein the service key is received from the first electronic device through the fabric server and the service server, wherein the service key is stored in the fabric server.

16. The method of claim 15, wherein the service data is decrypted based on the service key.

17. One or more non-transitory computer-readable storage media storing computer-executable instructions that, when executed by one or more processors of a first electronic device, cause the first electronic device to perform operations, the operations comprising:

generating a fabric key based on a pre-stored first device key and a second member key received from a second electronic device;

transmitting the fabric key to the second electronic device through a fabric server, which manages a fabric network, and a service server, which manages service data;

encrypting service data based on the fabric key; and transmitting the encrypted data to the second electronic device through the service server, wherein the fabric key is shared with the fabric server, which is a member entity of the fabric network, and the second electronic device, and wherein the encrypted data is decryptable at a member entity of the fabric network that shares the fabric key.

18. The one or more non-transitory computer-readable storage media of claim 17, the operations further comprising:

generating a first member key indicating that the first electronic device is a member provided with an E2EE service based on the first device key.

\* \* \* \* \*